(12) United States Patent
Moricz

(10) Patent No.: US 7,716,303 B2
(45) Date of Patent: *May 11, 2010

(54) ACCESSING DEEP WEB INFORMATION ASSOCIATED WITH TRANSPORTATION SERVICES USING A SEARCH ENGINE

(76) Inventor: Michael Z. Moricz, 13313 SE. 51st St., Bellevue, WA (US) 98006

( * ) Notice: Subject to any disclaimer, the term of this patent is extended or adjusted under 35 U.S.C. 154(b) by 702 days.

This patent is subject to a terminal disclaimer.

(21) Appl. No.: 11/595,090

(22) Filed: Nov. 8, 2006

(65) Prior Publication Data

US 2007/0055745 A1  Mar. 8, 2007

Related U.S. Application Data

(63) Continuation-in-part of application No. 10/397,992, filed on Mar. 25, 2003.

(60) Provisional application No. 60/366,817, filed on Mar. 25, 2002.

(51) Int. Cl.
*G06F 15/16* (2006.01)
(52) U.S. Cl. .......................... 709/217; 709/203; 707/2; 707/10
(58) Field of Classification Search ................. 709/203, 709/217; 707/2, 10, 9, 1, 6, 102, 101, 5, 707/4, 3, 100; 715/764, 234, 854, 848; 705/26, 705/27

See application file for complete search history.

(56) References Cited

U.S. PATENT DOCUMENTS

| | | | |
|---|---|---|---|
| 5,864,863 A | 1/1999 | Burrows | |
| 6,278,993 B1 | 8/2001 | Kumar et al. | |
| 6,321,251 B1 | 11/2001 | Deisinger et al. | |
| 6,487,555 B1 | 11/2002 | Bharat et al. | |
| 6,718,365 B1 * | 4/2004 | Dutta | 709/203 |
| 6,990,457 B1 * | 1/2006 | Litman et al. | 705/5 |
| 6,993,569 B1 | 1/2006 | Rees, Jr. | |
| 7,010,533 B1 * | 3/2006 | Kutsumi et al. | 707/10 |
| 7,277,923 B2 | 10/2007 | Rensin et al. | |
| 2001/0049676 A1 | 12/2001 | Kepler et al. | |
| 2001/0049687 A1 | 12/2001 | Russell | |
| 2002/0077871 A1 | 6/2002 | Udelhoven et al. | |

(Continued)

OTHER PUBLICATIONS

IncyWincy, webpages, copyright 2001.*

(Continued)

*Primary Examiner*—Ramy M Osman
*Assistant Examiner*—Barbara N Burgess
(74) *Attorney, Agent, or Firm*—Schwabe Williamson & Wyatt P.C.

(57) ABSTRACT

Methods, apparatuses, and articles for receiving a search request associated with a transportation service from a client device, the search request including a plurality of search criteria, are described herein. Additionally, the methods, apparatuses, and articles further return to the client device an answer page having a plurality of answers potentially associated with the transportation service, the plurality of answers identifying a plurality of information locations having information potentially associated with at least a one of the plurality of search criteria, where at least one of the answers includes at least one input field of a query answer page for entry of at least one feature of the transportation service, the query answer page to be dynamically generated by one of the information locations in response to a query.

21 Claims, 34 Drawing Sheets

U.S. PATENT DOCUMENTS

| | | | |
|---|---|---|---|
| 2002/0123991 | A1 | 9/2002 | Asami et al. |
| 2002/0133381 | A1 | 9/2002 | Tso |
| 2002/0133382 | A1* | 9/2002 | DeMarcken et al. ............ 705/5 |
| 2002/0152101 | A1 | 10/2002 | Lawson et al. |
| 2002/0194037 | A1 | 12/2002 | Creed et al. |
| 2003/0004760 | A1* | 1/2003 | Schiff et al. .................... 705/5 |
| 2003/0036930 | A1 | 2/2003 | Matos et al. |
| 2003/0046117 | A1* | 3/2003 | Jaehn et al. .................... 705/5 |
| 2003/0088544 | A1 | 5/2003 | Kan et al. |
| 2006/0206363 | A1 | 9/2006 | Gove |

OTHER PUBLICATIONS

IncyWincy, Background Information, copyright 2001.*

IncyWincy, Article, "Loop Improvements Launches IncyWincy, the Invisible Web Search Engine", Aug. 16, 2000.*

Warnick, W. et al., "Searching the Deep Web: Directed Query Engine Applications at the Department of Energy", Jan. 1, 2001, <http://www.dlib.org/dlib/january01/warnick/01warnick.html>[retrieved Jul. 19, 2006].

"Quigo Unveils Deep Web Search Technologies", Aug. 15, 2001, <http://www.quigo.com/press081501.htm>[retrieved Jul. 19, 2006].

Bruemmer, P., "Make Way for the Deep Crawl", Aug. 29, 2001, <http://www.clickz.com/experts/search/opt/article.php/874131> [retrieved Jul. 19, 2006].

Raghavan, S. and Garcia-Molina, H., "Crawling the Hidden Web" Sep. 11, 2001, Proceedings of 27th Int'l Conf. on VLDB, pp. 129-139, <http://www.dia.uniroma3.it~vldbproc/017_129.pdf> [retrieved Jul. 19, 2006].

Bergman, M., "The Deep Web: Surfacing Hidden Value" Sep. 24, 2001, Journal of Electronic Publishing 7(1), <http://www.brightplanet.com/pdf/deepwebwhitepaper.pdf> [retrieved Jul. 19, 2006].

Bruemmer, P., "Indexing Deep Web Content", Mar. 27, 2002, <http://www.searchengineguide.com/wi/2002/0327_wi2.html> [retrieved Jul. 19, 2006].

Mills, E., "Google flight search takes off", Oct. 28, 2005, <http://www.news.com/Gootle+flight+search+takes+off/2100-1038_3-5917821.html> [retrieved Jul. 19, 2006].

Agrawal, S. C. et al., "Location Based Services," TATA Consultancy Services White Paper, Sep. 2003, 43 pages.

International Search Report, for Application PCT/US07/84120, mailed on May 8, 2008.

International Search Report, for Application PCT/US03/09188, mailed on Jun. 24, 2003.

International Preliminary Report on Patentability, for Application PCT/US07/84120, mailed Nov. 8, 2006.

* cited by examiner

| Uniform Resource Locators 302 | Search Criteria 304 |
|---|---|
| | |
| http://www.automall.com/used.html?make=ford&model=focus&zip=22043 | Focus 22043 |
| http://www.automall.com/used.html?make=ford&model=focus&zip=22043 | 22043 Focus |
| http://www.automall.com/used.html?make=ford&model=focus&zip=22043 | Focus Falls Church |
| http://www.automall.com/used.html?make=ford&model=focus&zip=22043 | Falls Church Focus |
| http://www.automall.com/used.html?make=ford&model=taurus&zip=22043 | Taurus 22043 |
| http://www.automall.com/used.html?make=ford&model=taurus&zip=22043 | 22043 Taurus |
| http://www.automall.com/used.html?make=ford&model=taurus&zip=22043 | Taurus Falls Church |
| http://www.automall.com/used.html?make=ford&model=taurus&zip=22043 | Falls Church Taurus |
| | |
| http://www.oursite.com/proxyjoescars.html?Make=ford&Model=focus&Zip=22043&Year=1982-2002 | Focus 22043 |
| http://www.oursite.com/proxyjoescars.html?Make=ford&Model=focus&Zip=22043&Year=1982-2002 | 22043 Focus |
| http://www.oursite.com/proxyjoescars.html?Make=ford&Model=focus&Zip=22043&Year=1982-2002 | Focus Falls Church |
| http://www.oursite.com/proxyjoescars.html?Make=ford&Model=focus&Zip=&22043&Year=1982-2002 | Falls Church Focus |
| http://www.oursite.com/proxyjoescars.html?Make=ford&Model=granada&Zip=22043&Year=1982-2002 | Granada 22043 |
| http://www.oursite.com/proxyjoescars.html?Make=ford&Model=granada&Zip=22043&Year=1982-2002 | 22043 Granada |
| http://www.oursite.com/proxyjoescars.html?Make=ford&Model=granada&Zip=22043&Year=1982-2002 | Granada Falls Church |
| http://www.oursite.com/proxyjoescars.html?Make=ford&Model=granada&Zip=22043&Year=1982-2002 | Falls Church Granada |
| | |
| | |

Figure 3a

| Uniform Resource Locators 312 | Search Criteria 314 |
|---|---|
| | |
| http://www.generaltravel.com/res.html?persons=1&from=bwi&to=sfo&leave=0810&return=0815 | Baltimore San Francisco 0810 0815 |
| http://www.generaltravel.com/res.html?persons=1&from=bwi&to=sfo&leave=0810&return=0815 | BWI San Francisco 0810 0815 |
| http://www.generaltravel.com/res.html?persons=1&from=bwi&to=sfo&leave=0810&return=0815 | Baltimore SFO 0810 0815 |
| http://www.generaltravel.com/res.html?persons=1&from=bwi&to=sfo&leave=0810&return=0815 | BWI SFO 0810 0815 |
| | |
| | |
| | |
| | |
| | |

Figure 3b

```
<SEARCHFORMAT>                                              119a
<DOC
url=http://www.automall.com/used.html?make=ford&model=focus&zip=22043>
<CONTENT type="text/html">
<HTML>
<HEAD>
<TITLE>Ford Focus 22043 - Automall.com</TITLE>
<META name="keywords" content="Focus, 22043">
</HEAD>
<BODY>
<H1> Ford Focus 22043 - Automall.com</H1>
<P>
<H2>Find used car pricing information for Focus 22043 at Automall.com.</H2>
<H2>Automall.com is your source for used car information.</H2>
</BODY>
</HTML>
</CONTENT>
</DOC>
</SEARCHFORMAT>
```

Figure 4a

```
<SEARCHFORMAT>                                     119b
<DOC
url=http://www.generaltravel.com/res.html?persons=1&from=bwi&to=sfo&leave=08
10&return=0815>
<CONTENT type="text/html">
<HTML>
<HEAD>
<TITLE>Leave BWI 08/10/02, Return from SFO 08/15/02 –
GeneralTravel.com</TITLE>
<META name="keywords" content="Baltimore,San Francisco,0810,0815">
</HEAD>
<BODY>
<H1> Leave BWI 08/10/02, Return from SFO 08/15/02 – GeneralTravel.com </H1>
<P>
<H2>Find airline reservation information for "Baltimore San Francisco 0810 0815"
at GeneralTravel.com</H2>
<H2>GeneralTravel.com can make all your travel reservations.</H2>
</BODY>
</HTML>
</CONTENT>
</DOC>
</SEARCHFORMAT>
```

Ford Focus 22043 - Automall.com   ~ 502a
...Find used car pricing information for Focus 22043 at Automall.com
Automall.com is your source for used car information...
http://www.automall.com/used.html?make=ford&model=focus&zip=22043

Ford Focus 22043 1982-2002 - JoesCars.com   ~ 502b
...Find used car pricing information for Focus 22043 at JoesCars.com.
JoesCars.com is a cool place to find used car information...
http://www.oursite.com/proxyjoescars.html?Make=ford&Model=focus&Zip=
22043&Year=1982-2002

Leave BWI 08/10/02, Return from SFO 08/15/02 – GeneralTravel.com ~ 502c
...Find airline reservation information for "0810 Baltimore San Francisco 0815" at GeneralTravel.com
GeneralTravel.com can make all your travel reservations...
http://www.generaltravel.com/res.html?persons=1&from=bwi&to=sfo&leave=0810&return=0815

Leave BWI 08/10/02, Return from SFO 08/15/02 – FastJet.com ~ 502d
...Find airline reservation information for "0810 Baltimore San Francisco 0815" at FastJet.com
The quickest and best service in the airline industry...
http://www.fastjet.com/res.html?fdest=bwi&tdest=sfo&start=0810&end=0815

```
<form name="home" method="POST" action="used.html">
 <b>Used Car Search<br>
   Get FREE listings in your area.</b><br>
 <b>Make:</b><br>
     <select name="used_make">
         <option value="">Select A Make</option>
         <option value='Acura'>Acura</option>
         <option value='Buick'>Buick</option>
         <option value='Chrysler'>Chrysler</option>
         <option value='Daewoo'>Daewoo</option>
         <option selected value='Ford'>Ford</option>

</select>
 <b>Model:</b><br>
     <select name="used_model">
         <option value="">Select A Model</option>
         <option value="Astro">Astro</option>
         <option value="Avalanche 1500">Avalanche 1500</option>

<option selected value="Focus">Focus</option>

</select>
  <b>Your ZIP</b><br>
     <input type="text" name="zipcode" value="22043" size="8" maxlength="5">
     <br>
     <input type="Submit" name="cmdSubmit" value="Continue">
</form>
```

Figure 6a

```
<form method="POST" action="res.html" name="FlightSearch">
 <b>Fare Finder</b>
 <a href="more_options.html">More options</a><br>
 From <input type=text name=from size=11 value="bwi" >
 To   <input type=text name=to   size=11 value="sfo" >

<input type="radio" name="Way" value="RoundTrip" checked >Round trip
 <input type="radio" name="Way" value="OneWay" >One way<br>
 <a href="multi_city.html">Multi city</a><br>

Persons <select name="persons">
    <option value="1" selected>1</option>

</select>

Departure date<br>
 <select name="leave_month">

<option value="05" selected>May</option>

</select>
 <select name="leave_date">

<option value="04" selected>4</option>
    <option value="05" >5</option>

</select>
 <select name="leave_td">
    <option value="morning" selected>Morning</option>

</select>
 <br>

*Return portion omitted*

Search by
   <input type="radio" name="lowestfares" value="schedule">Schedule
   <input type="radio" name="lowestfares" value="price" checked >Price
   <br>
   <input type=submit value="Check" >
 </form>
```

Sponsored Link

PRICELINE -- Name Your Own Price FLIGHT DEALS!
www.priceline.com    Bid now for great deals. Get an answer in as little as 2 minutes.

FLIGHT Deals - Save on AIRLINE TICKETS Here!
www.Orbitz.com    FLIGHT - Comapre FARES on 450+ Airlines - Book NOW!

Horizon Air Lowers Fares from Fresno to Portland and Seattle
...advance from Fresno to Portland or Seattle is $105...and are nonrefundable; however,
the flight ticket can...to Sacramento, and from Portland and San Jose to Tucson....
www.alaskasworld.com/newsroom/qxnews/QXstories/QX_20020319_145647.asp - 13k - Cached - Similar pages Southwest Airlines Vacations - Vacation travel packages to Las...
...Sacramento, San Jose, Oakland, from $259, Seattle, from $359...BAY AREA Sample two-night
San Francisco Bay...Flight service for San Francisco Bay area packages is....
www.swavacations.com/about/press/calsale1.asp - 31k - Cached - Similar pages Figure 8b (Prior Art)

CALIFORNIA DREAMIN' ON SALE WITH
$30 OFF PER PERSON FROM SOUTHWEST AIRLINES VACATIONS

DALLAS, March 5, 2002 – Southwest Airlines Vacations Customers dreaming of a California vacation with movie stars, warm beaches, or cable cars can discover it for less with $30 off per person to Los Angeles/Anaheim, San Diego, or the San Francisco Bay area. The California Dreamin'℠ sale is available to Customers traveling from Phoenix and Tucson, Ariz; Kansas City, Mo; New Orleans; Las Vegas; Reno, Nev.; Albuquerque, N.M.; El Paso, Austin, Houston and San Antonio, Texas; Salt Lake City; Seattle; Portland, Ore. and all applicable California origins. Getaways to the Golden State are available on complete air/hotel vacations when purchased by May 24, 2002 for travel March 31 through June 29, 2002.

Customers can enjoy more value when they customize their complete vacation by purchasing the following California attraction passes:

- Purchase a one-day adult SeaWorld® San Diego admission and receive a second day admission free with San Diego and Los Angeles/Anaheim packages.
- Purchase a one-day adult Universal Studios Hollywood® admission and receive a second day admission free

---

CALIFORNIA DREAMIN'℠ SALE COMPLETE VACATION PRICES

Figure 8c (Prior Art)

Horizon Air Lowers Fares from Fresno to Portland and Seattle

3/19/2002 2:57 p.m.

"These new fares dramatically reduce the cost for business travelers and provide a new lower regular fare for leisure travelers," said Patrick Zachwieja, vice president of marketing and planning. "These fares are in addition to any limited-time specials and sale fares that may appear from time to time."

A one-way fare with a 21-day advance from Fresno to Portland or Seattle is $105, based on a roundtrip purchase. A 14-day advance fare is $135, based on a roundtrip purchase.

The above fares include Federal Excise Tax and any applicable fuel surcharges, but they do not include Passenger Facility Charges of up to $18 (amount depends on itinerary), Federal Segment Tax of $3 per segment (takeoff and landing) on itinerary, and September 11th Security Fee of $2.50 per enplanement (up to $10). Roundtrip sale fares may be limited and are nonrefundable; however, the flight ticket can be changed for a $50 fee, plus any applicable changes in fare. All fares are subject to change without notice.

Horizon Air has served Fresno since March of 1999. Horizon Air serves 41 cities throughout Washington, Oregon, Idaho, Montana, California, Arizona, British Columbia, and Alberta.

In the last few months, Horizon Air has added service in several cities: between Medford and Los Angeles, from Boise and Palm Springs to Sacramento, and from Portland and San Jose to Tucson. Horizon will add service from San Diego and San Francisco to Boise on April 1, and from Portland and Boise to Denver on April 28.

Shop for Flights and Fares

Look up a Saved Reservation

From:
Seattle
Seattle

To:
San Jose
San Jose

Adults: 1  Ages 13+   Children: 0  Ages 2-12

Anyone, age 2-17 traveling alone?

CityList Departing: Mar 19 7 am

CityList Returning: Mar 19 7 am

Cabin/Fare: About Fare Options
Coach/Restricted Fare

| ONE WAY | ROUND TRIP |
|---|---|
| 0 | 0 |
| N | T |
|  | FltFares |

Multiple Destinations

Bottom of Form

|car rentals in maui | Search |

1. www.avis.com
   City or airport: maui
   Pick-up date: 09/09/2006  time: 10:00 am
   Return date: 09/15/2006  time: 10:00 am
   Vehicle type: Compact   Check 2. www.hertz.com
   City or airport: maui
   Pick-up date: 09/09/2006  time: 10:00 am
   Return date: 09/15/2006  time: 10:00 am
   Vehicle type: Mid-Size   Check 3. www.dollar.com
   City or airport: maui
   Pick-up date: 09/09/2006  time: 10:00 am
   Return date: 09/15/2006  time: 10:00 am
   Vehicle type: Compact   Check 4. Alamo Rent A Car
   ... Maui Hawaii, Houston, Kansas City, Maine, New Jersey, Washington DC..
   ... Alamo Rent A Car offers airport car rental, airport rental cars, alamo, ...
   www.alamo.com/ - 8k 5. Maui Car Rentals
   Affordable rentals on Maui. Near the Kahului OGG airport.
   www.mauicarrentals.net/ - 23k 6. Kauai, Hawaii car rentals - Rent a car in Maui, Kauai, Hawaii
   Wailua Bay offers discount Kauai car rentals in Hawaii. Rental Cars available in Kauai, Maui, Hawaii and more. Compare rates instantly.
   www.wailuabay.com/car_rentals.html - 44k 7. Maui rental cars Maui discount car rentals Maui Hawaii Word of ...
   Maui Hawaii car rentals - inexpensive and discount rental cars Maui Hawaii discount car rental agency near airport in Kahului, Maui, Hawaii, ...
   www.mauirentacar.com/ - 15k 8. Maui Car Rentals from Aloha rent a car. - 1-877-452-5642

| car rentals in maui | Search |

1. Alamo Rent A Car
   ... Maui Hawaii, Houston, Kansas City, Maine, New Jersey, Washington DC.
   ... Alamo Rent A Car offers airport car rental, airport rental cars, alamo, ...
   www.alamo.com/ - 8k 2. www.avis.com City or airport: maui
   Pick-up date: 09/09/2006    time: 10:00 am
   Return date: 09/15/2006     time: 10:00 am
   Vehicle type: Compact       Check 3. Maui Car Rentals
   Affordable rentals on Maui. Near the Kahului OGG airport.
   www.mauicarrentals.net/ - 23k 4. www.hertz.com City or airport: maui
   Pick-up date: 09/09/2006    time: 10:00 am
   Return date: 09/15/2006     time: 10:00 am
   Vehicle type: Mid-Size      Check 5. Kauai, Hawaii car rentals - Rent a car in Maui, Kauai, Hawaii
   Wailua Bay offers discount Kauai car rentals in Hawaii. Rental Cars available in Kauai, Maui, Hawaii and more. Compare rates instantly.
   www.wailuabay.com/car_rentals.html - 44k 6. www.dollar.com City or airport: maui
   Pick-up date: mm/dd/yyyy    time: Select a time
   Return date: mm/dd/yyyy     time: Select a time
   Vehicle type: Compact       Check 7. Maui rental cars Maui discount car rentals Maui Hawaii Word of ...

|car rentals in maui                              | Search |

Car rentals in maui:
City or airport: maui
Pick-up date: 09/09/2006   time: 10:00 am
Return date:  09/15/2006   time: 10:00 am
Vehicle type: Mid-Size
Check: www.avis.com - www.hertz.com - www.dollar.com - www.thrifty.com - www.budget.com - www.enterprise.com - www.national.com 1. Alamo Rent A Car
   ... Maui Hawaii, Houston, Kansas City, Maine, New Jersey, Washington DC.
   ... Alamo Rent A Car offers airport car rental, airport rental cars, alamo, ...
   www.alamo.com/ - 8k 2. Maui Car Rentals
   Affordable rentals on Maui. Near the Kahului OGG airport.
   www.mauicarrentals.net/ - 23k 3. Kauai, Hawaii car rentals - Rent a car in Maui, Kauai, Hawaii.
   Wailua Bay offers discount Kauai car rentals in Hawaii. Rental Cars available in Kauai, Maui, Hawaii and more. Compare rates instantly.
   www.wailuabay.com/car_rentals.html - 44k 4. Maui rental cars Maui discount car rentals Maui Hawaii Word of...
   Maui Hawaii car rentals - inexpensive and discount rental cars Maui Hawaii discount car rental agency near airport in Kahului, Maui, Hawaii,...
   www.mauirentacar.com/ - 15k 5. Maui Car Rentals from Aloha rent a car - 1-877-452-5642
   Maui car rental company; we take pride in our service and our vehicles. 1-877-452-5642.
   www.aloharentacar.com/ - 15k 6. Maui Car RentalMaui/Car Rentals and Hawaii. Maui Car Rentals. ...
   Maui Cheap Car Rental - Weekly and monthly rates avail. Used Toyota and Nissan USA (877)749-7889 CAN ...
   www.hawaiianrainbow.com/Maui/Car_Rentals/ - 39k 7. Maui and Hawaii. Maui
   Maui Car Rentals Maui Cruisers Car Rental has 'Local style' cars. See pictures of our cars, ... Maui Cheap Car Rental - Weekly and monthly rates avail. ...
   www.hawaiianrainbow.com/Maui/ - 50k 8. Island Riders - Harley Davidson, Jeep & Exotic Car Rentals in Maui ...
   Island Riders rents Harley Davidson motorcycles, Mopeds, Jeeps and Exotic cars. Featuring two locations on Maui, Island Riders is your best and most ...

| car rentals in maui | Search |

1. Alamo Rent A Car
   ... Maui Hawaii; Houston; Kansas City; Maine; New Jersey; Washington DC.
   ... Alamo Rent A Car offers airport car rental, airport rental cars, alamo, ...
   www.alamo.com/ - 8k 2. Maui Car Rentals
   Affordable rentals on Maui. Near the Kahului OGG airport.
   www.mauicarrentals.net/ - 23k 3. Kauai, Hawaii car rentals - Rent a car in Maui, Kauai; Hawaii
   Wailua Bay offers discount Kauai car rentals in Hawaii. Rental Cars available in Kauai, Maui, Hawaii and more.
   Compare rates instantly.
   www.wailuabay.com/car_rentals.html - 44k 4. Maui rental cars Maui discount car rentals Maui Hawaii Word of...
   Maui Hawaii car rentals - inexpensive and discount rental cars Maui Hawaii discount car rental agency near airport in
   Kahului, Maui, Hawaii; ...
   www.mauirentacar.com/ - 15k 5. Maui Car Rentals from Aloha rent a car - 1-877-452-5642
   Maui car rental company, we take pride in our service and our vehicles. 1-877-452-5642.
   www.aloharentacar.com/ - 15k 6. Maui Car Rental/Maui/Car Rentals and Hawaii Maui Car Rentals, ...
   Maui Cheap Car Rental - Weekly and monthly rates avail. Used Toyota and Nissan USA (877)749-7889 CAN ...
   www.hawaiianrainbow.com/Maui/Car_Rentals/ - 39k 7. Maui and Hawaii Maui
   Maui Car Rentals Maui Cruisers Car Rental has 'Local style' cars. See pictures of our cars, ... Maui Cheap Car Rental -
   Weekly, and monthly rates avail ...
   www.hawaiianrainbow.com/Maui/ - 50k 8. Island Riders - Harley Davidson, Jeep & Exotic Car Rentals in Maui ...
   Island Riders rents Harley Davidson motorcycles, Mopeds, Jeeps and Exotic cars. Featuring two locations on Maui,
   Island Riders is your best and most ...
   www.islandriders.com/ - 17k www.avis.com
City or airport: maui
Pick-up: 09/09/2006  10:00 am
Return: 09/15/2006  10:00 am
Type: Compact  Check www.hertz.com
City or airport: maui
Pick-up: 09/09/2006  10:00 am
Return: 09/15/2006  10:00 am
Type: Mid-Size  Check www.dollar.com
City or airport: maui
Pick-up: 09/09/2006  10:00 am
Return: 09/15/2006  10:00 am
Type: Compact  Check

Figure 10d

```html
<FORM METHOD="POST" NAME="resForm" id="resForm" ACTION="http://www.dollar.com/index.aspx">
  <A HREF="http://www.dollar.com/">www.dollar.com</A>
  <TABLE>
  <TR>
    <TD>City or airport: </TD>
    <TD COLSPAN="3"><INPUT TYPE="text" NAME="res1:ploc" VALUE="maui" SIZE="35"></TD>
    <INPUT TYPE="hidden" NAME="res1:rloc" VALUE="maui" SIZE="35">
  </TR>
  <TR>
    <TD>Pick-up date: </TD>
    <TD><INPUT TYPE="text" NAME="res1:pdt" VALUE="09/09/2006" SIZE="10">
    <TD align="right"> time: </TD>
    <TD><SELECT NAME="res1_phour">
        <option value="00:00">12:00 am</option><option value="00:30">12:30 am</option>
        <option value="01:00"> 1:00 am</option><option value="01:30"> 1:30 am</option>
        <option value="02:00"> 2:00 am</option><option value="23:00">11:00 pm</option>
        <option value="23:30">11:30 pm</option>
      </SELECT>
    </TD><TD> </TD>
  </TR>
  <TR>
    <TD>Return date: </TD>
    <TD><INPUT TYPE="text" NAME="res1:rdt" VALUE="09/15/2006" SIZE="10">
    <TD align="right"> time: </TD>
    <TD><SELECT NAME="res1:rhour">
        <option value="00:00">12:00 am</option><option value="00:30">12:30 am</option>
        <option value="01:00"> 1:00 am</option><option value="01:30"> 1:30 am</option>
        <option value="02:00"> 2:00 am</option><option value="23:00">11:00 pm</option>
        <option value="23:30">11:30 pm</option>
      </SELECT></TD>
  </TR>
  <TR>
    <TD> </TD>
    <TD>Vehicle type: </TD><TD> </TD>
    <TD><SELECT NAME="res1:lstVehicleSelect">
        <option selected="selected" value="EDAR">Economy</option>
        <option value="CDAR">Compact</option><option value="IDAR">Intermediate</option>
        <option value="IXAR">Intermediate Special</option><option value="FDAR">Full Size</option>
        <option value="PDAR">Premium</option><option value="LDAR">Luxury</option>
        <option value="STAR">Convertible</option><option value="MVAR">Minivan</option>
        <option value="IFAR">SUV Intermediate</option><option value="IJAR">ATV Intermediate</option>
        <option value="SFAR">SUV Full Size</option><option value="PFAR">SUV Premium</option>
      </SELECT></TD>
    <TD><INPUT TYPE="submit" NAME="res1:btnRateShop" VALUE="Check"></TD>
  </TR>
  </TABLE>

<input name="res1:pcode" id="res1_pcode" type="hidden" />
  <input name="res1:rcode" id="res1_rcode" type="hidden" value="Same" />
  <input name="res1:pselector" id="res1_pselector" type="hidden" value="False" />
  <input name="res1:rselector" id="res1_rselector" type="hidden" value="False" />
  <input name="res1:directLink" id="res1_directLink" type="hidden" />
  <input name="res1:cultureForLocationSelector" id="res1_cultureForLocationSelector" type="hidden" value="en-US" />
  <input name="res1:resCarType" id="res1_resCarType" type="hidden" />
</FORM>
```

| train from paris to milan | Search |

Train de Grande Vitesse | Tren Italia | Eurostar
Leaving from: paris | Leaving from: paris | Leaving from: paris
Going to: milan | Going to: milan | Going to: milan
Travel date: 10/10/2006 Check | Travel date: 10/10/2006 Check | Travel date: 10/10/2006 Check 1. Europe high speed trains: AVE, ARTESIA, EUROSTAR, ICE, THALYS, TGV ...
   Luzern-Fluelen-St. Gotthard-Locarno/Lugano. Night Trains. Artesia: France-Italy Night
   Paris-Florence-Milan-Rome and more... Paris-Germany Night ...
   www.raileurope.com/us/rail/specialty/index.htm - 13k 2. Travel from France to Italy aboard the Artesia train
   Get instant online bookings for tickets and reservation on any train in Europe. ...
   Paris - Milan: 10 hours 30 minutes. Paris - Venice: 12 hours 30 minutes ...
   www.raileurope.com/us/rail/specialty/artesia_night.htm - 23k 3. Rail Europe - Trains to France, Belgium, Germany, Netherlands ...
   TGVs run between Paris and Milan twice a day so you can visit France and Italy ...
   The trains run from Paris and Brussels to a range of cities in Northern ...
   www.raileurope.co.uk/europeantickets/destinations.htm - 40k 4. How to travel by train from London to Italy | Venice Florence Rome ...
   The night train for Paris leaves Milan at 23:25, and a Eurostar connection will
   get you back to London at 11:55. See the London to Milan section for details ...
   www.seat61.com/Italy.htm - 232k 5. Artesia Trains - European Trains - European Rail Guide
   Five daily round-trip connections between France and Italy cover a route along stunning
   countryside between Paris, Lyon, Milan, and Turin. Artesia trains ...
   www.europeanrailguide.com/trains/artesia.html - 10k 6. Europe's Premier Highspeed Trains Travel by Euro Railways
   A premier train operate between France (Paris/Lyon) and Italy (Turin/Milan), Berlin Warsaw
   Express (requires Adobe Reader) A premier train operate between ...
   www.eurorailways.com/rail/premier/index.htm - 39k 7. Rail Plus Hotel Trains
   Leave from Paris and wake up in Madrid on the Train Hotel Elipsos or speed from Rome to Paris ...

Figure 12a

1202b train from paris to milan                          Search

1. Europe high speed trains: AVE, ARTESIA, EUROSTAR, ICE, THALYS, TGV ...
   Luzern-Fluelen-St. Gotthard-Locarno/Lugano. Night Trains, Artesia France-Italy Night
   Paris-Florence-Milan-Rome and more... Paris-Germany Night ...
   www.raileurope.com/us/rail/specialty/index.htm - 13k 2. Travel from France to Italy aboard the Artesia train
   Get instant online bookings for tickets and reservation on any train in Europe. ...
   Paris - Milan: 10 hours 30 minutes. Paris - Venice: 12 hours 30 minutes ...
   www.raileurope.com/us/rail/specialty/artesia_night.htm - 23k

• Train de Grande Vitesse           • Tren Italia                  • Eurostar
   Leaving from: paris                 Leaving from: paris            Leaving from: paris
   Going to: milan                     Going to: milan                Going to: milan
   Travel date: 10/10/2006  Check      Travel date: 10/10/2006  Check Travel date: 10/10/2006  Check 3. Rail Europe - Trains to France, Belgium, Germany, Netherlands ...
   TGVs run between Paris and Milan twice a day so you can visit France and Italy ...
   The trains run from Paris and Brussels to a range of cities in Northern ...
   www.raileurope.co.uk/europeantickets/destinations.htm - 40k 4. How to travel by train from London to Italy | Venice Florence Rome ...
   The night train for Paris leaves Milan at 23:25, and a Eurostar connection will
   get you back to London at 11:55. See the London to Milan section for details ...
   www.seat61.com/Italy.htm - 232k 5. Artesia Trains - European Trains - European Rail Guide
   Five daily round-trip connections between France and Italy cover a route along stunning
   countryside between Paris, Lyon, Milan, and Turin. Artesia trains ...
   www.europeanrailguide.com/trains/artesia.html - 10k 6. Europe's Premier Highspeed Trains Travel by Euro Railways
   A premier train operate between France (Paris/Lyon) and Italy (Turin/Milan). Berlin Warsaw
   Express (requires Adobe Reader) A premier train operate between ...
   www.eurorailways.com/rail/premier/index.htm - 39k 7. Rail Plus Hotel Trains
   Leave from Paris and wake up in Madrid on the Train Hotel Elipsos or speed from Rome to Paris ...
   Train Hotel Elipsos: Paris-Madrid-Barcelona-Zurich-Milan ...
   www.railplus.com.au/trains/hotel_trains.cfm - 11k

| train from paris to milan | Search | train from paris to milan
Leaving from: paris
Going to: milan
Travel date: 10/10/2006
Check: Train de Grande Vitesse - Tren Italia - Eurostar - Virgin Trains - SNCF 1. Europe high speed trains: AVE, ARTESIA, EUROSTAR, ICE, THALYS, TGV...
   Luzern-Fluelen-St. Gotthard-Locarno/Lugano. Night Trains. Artesia: France-Italy Night
   Paris-Florence-Milan-Rome and more... Paris-Germany Night ...
   www.raileurope.com/us/rail/specialty/index.htm - 13k 2. Travel from France to Italy aboard the Artesia train
   Get instant online bookings for tickets and reservation on any train in Europe. ...
   Paris - Milan: 10 hours 30 minutes. Paris - Venice: 12 hours 30 minutes ...
   www.raileurope.com/us/rail/specialty/artesia_night.htm - 23k 3. Rail Europe - Trains to France, Belgium, Germany, Netherlands ...
   TGVs run between Paris and Milan twice a day so you can visit France and Italy ...
   The trains run from Paris and Brussels to a range of cities in Northern ...
   www.raileurope.co.uk/europeantickets/destinations.htm - 40k 4. How to travel by train from London to Italy | Venice Florence Rome ...
   The night train for Paris leaves Milan at 23:25, and a Eurostar connection will
   get you back to London at 11:55. See the London to Milan section for details ...
   www.seat61.com/Italy.htm - 232k 5. Artesia Trains - European Trains - European Rail Guide
   Five daily round-trip connections between France and Italy cover a route along stunning
   countryside between Paris, Lyon, Milan, and Turin. Artesia trains ...
   www.europeanrailguide.com/trains/artesia.html - 10k 6. Europe's Premier Highspeed Trains Travel by Euro Railways
   A premier train operate between France (Paris/Lyon) and Italy (Turin/Milan). Berlin Warsaw
   Express (requires Adobe Reader) A premier train operate between ...
   www.eurorailways.com/rail/premier/index.htm - 39k 7. Rail Plus Hotel Trains
   Leave from Paris and wake up in Madrid on the Train Hotel Elipsos or speed from Rome to Paris ...

|train from paris to milan| Search

1. Europe high speed trains: AVE, ARTESIA, EUROSTAR, ICE, THALYS, TGV ...
   Luzern-Fluelen-St. Gotthard-Locarno/Lugano. Night Trains. Artesia: France-Italy Night
   Paris-Florence-Milan-Rome and more ... Paris-Germany Night ...
   www.raileurope.com/us/rail/specialty/index.htm - 13k 2. Travel from France to Italy aboard the Artesia train
   Get instant online bookings for tickets and reservation on any train in Europe, ...
   Paris - Milan: 10 hours 30 minutes. Paris - Venice: 12 hours 30 minutes ...
   www.raileurope.com/us/rail/specialty/artesia_night.htm - 23k 3. Rail Europe - Trains to France, Belgium, Germany, Netherlands ...
   TGVs run between Paris and Milan twice a day so you can visit France and Italy ...
   The trains run from Paris and Brussels to a range of cities in Northern ...
   www.raileurope.co.uk/europeantickets/destinations.htm - 40k 4. How to travel by train from London to Italy | Venice Florence Rome ...
   The night train for Paris leaves Milan at 23:25, and a Eurostar connection will
   get you back to London at 11:55. See the London to Milan section for details ...
   www.seat61.com/Italy.htm - 232k 5. Artesia Trains - European Trains - European Rail Guide
   Five daily round-trip connections between France and Italy cover a route along stunning
   countryside between Paris, Lyon, Milan, and Turin. Artesia trains ...
   www.europeanrailguide.com/trains/artesia.html - 10k 6. Europe's Premier Highspeed Trains Travel by Euro Railways
   A premier train operate between France (Paris/Lyon) and Italy (Turin/Milan). Berlin Warsaw
   Express (requires Adobe Reader) A premier train operate between ...
   www.eurorailways.com/rail/premier/index.htm - 39k 7. Rail Plus Hotel Trains
   Leave from Paris and wake up in Madrid on the Train Hotel Elipsos or speed from Rome to Paris ...
   Train Hotel Elipsos: Paris-Madrid-Barcelona-Zurich-Milan ...
   www.railplus.com.au/trains/hotel_trains.cfm - 11k 8. Transportation
   Arriving via the motorway from Paris/Lyon, Milan/Geneva, Barcelona/Marseille, ...
   which is next to Grenoble train station* and stops at the 'Place de la ...
   www.ill.fr/pages/menu_g/howtocome.htm - 9k Train de Grande Vitesse
Leaving from: paris
Going to: milan
Travel date: 10/10/2006  Check Tren Italia
Leaving from: paris
Going to: milan
Travel date: 10/10/2006  Check Eurostar
Leaving from: paris
Going to: milan
Travel date: 10/10/2006  Check Virgin Trains
Leaving from: paris
Going to: milan
Travel date: 10/10/2006  Check SNCF
Leaving from: paris
Going to: milan
Travel date: 10/10/2006  Check

Figure 12d

```html
<form name="cercaTreno" action="http://orarioint.trenitalia.com/bin/query.exe/en">
   Leaving from? <BR>
   <input type="text" name="from"><BR>
   Going to? <BR>
   <input type="text" name="to"><BR>
   Travel date? <BR>
   day
   <select name="dateDay">
     <option value="01">01</option>
     <option value="02">02</option>
     <option value="03">03</option>
     ...
     <option value="31">31</option>
   </select>
   month
   <select name="dateMonth">
     <option value="01">01</option>
     <option value="02">02</option>
     <option value="03">03</option>
     ...
     <option value="12">12</option>
   </select>
   year
   <select id="dateYear" name="dateYear">
     <option value="2006">2006</option>
     <option value="2007">2007</option>
     <option value="2008">2008</option>
   </select>
   Time of travel? (24h clock)<BR>
   hour
   <select name="timeHour">
     <option value="00">00</option>
     <option value="01">01</option>
     <option value="02">02</option>
     ...
     <option value="23">23</option>
   </select>
   minute
   <select name="timeMinute">
     <option value="00">00</option>
     <option value="01">01</option>
     <option value="02">02</option>
     ...
     <option value="59">59</option>
   </select>
   <BR>
   <input type="submit" value="Send">
</form>
```

| | | | | | |
|---|---|---|---|---|---|
| | | flight 479 status | | | Search |
| United Airlines | Flight number: | 479 | Date: | 10/10/2006 | Check |
| American Airlines | Flight number: | 479 | Date: | 10/10/2006 | Check |
| Alaska Airlines | Flight number: | 479 | Date: | 10/10/2006 | Check |
| Delta Airlines | Flight number: | 479 | Date: | 10/10/2006 | Check |
| North West/KLM | Flight number: | 479 | Date: | 10/10/2006 | Check |
| SAS | Flight number: | 479 | Date: | 10/10/2006 | Check |
| Air China | Flight number: | 479 | Date: | 10/10/2006 | Check |

1. Status Update: XML:RSS, Magpie, cvs2rss, wp-agg, etc - Laughing Meme
   Status Update: XML:RSS, Magpie, cvs2rss, wp-agg, etc ...
   Flights said 479 days later:. Flights, British Airways Flights, Domestic Flights, Economic Flights ...
   laughingmeme.org/articles/2005/05/28/status-update-xml-rss-magpie-cvs2rss-wp-agg-etc - 90k 2. AltynAir
   Route flight No, Departure, Arrival, Days. Bishkek-Moscow ...
   QH 479. 14:20, 16:45, - - - - 5 - -. QH 480. 18:45, 04:35, - - - - 5 - - ...
   www.altynair.kg/en/flightsinfo/timetable/ - 30k 3. Category & forums listing - NASA Space Flight
   Click HERE to join. 479, 5799. Space Flight L2: Constellation and Future ...
   she prepares to join her two sisters in returning the fleet to launch status. ...
   forum.nasaspaceflight.com/ - 35k 4. STATUS REPORT
   We are continuing to coordinate with the Flight Operations Team and to assist ...
   Power OFF 49234 257/0452 00-479 NBTR Playback 49234 257/0535 00-479 NBTR ...
   umpgal.gsfc.nasa.gov/www_root/homepage/uars-science/Weekly_Status/Weekly_Status_092200.html - 19k 5. Airline Travel Info - SFO, OAK, Real-Time Flight Status
   Find links on real-time flight status, airfare ticket purchasing, airport information and ...
   San Rafael, CA 94903 Phone: (415) 457-2717 Fax: (415) 479-7017 ...
   www.marindoortodoor.com/travel/airline-travel.htm - 27k 6. FlightStats - SEA Airport Departure & Arrival Flight Status and ...
   The most complete, real-time flight status and flight tracker in the world including ...
   SFO, San Francisco, UA 479, United Airlines, 06:03 AM, 06:09 AM ...
   www.flightstats.com/go/FlightStatus/flightStatusByAirport.do?airportCode=SEA&airportQueryDate=2006-10... - 491k

| flight 479 status | Search |

1. Status Update: XML::RSS, Magpie, cvs2rss, wp-agg, etc - Laughing Meme
   Status Update: XML::RSS, Magpie, cvs2rss, wp-agg, etc ...
   Flights said 479 days later:. Flights. British Airways Flights, Domestic Flights, Economic Flights ...
   laughingmeme.org/articles/2005/05/28/status-update-xml-rss-magpie-cvs2rss-wp-agg-etc - 90k 2. United Airlines
   Flight number: 479   Date: 10/10/2006   Check 3. American Airlines
   Flight number: 479   Date: 10/10/2006   Check 4. AltynAir
   Route flight No, Departure, Arrival, Days, Bishkek-Moscow ...
   QH 479. 14:20, 16:45, - - - - 5 - -. QH 480. 18:45, 04:35, - - - - 5 - - ...
   www.altynair.kg/en/flightsinfo/timetable/ - 30k 5. Alaska Airlines
   Flight number: 479   Date: 10/10/2006   Check 6. Category & forums listing - NASA Space Flight
   Click HERE to join. 479, 5799. Space Flight L2: Constellation and Future ...
   she prepares to join her two sisters in returning the fleet to launch status, ...
   forum.nasaspaceflight.com/ - 35k 7. Delta Airlines
   Flight number: 479   Date: 10/10/2006   Check 8. STATUS REPORT
   We are continuing to coordinate with the Flight Operations Team and to assist ...
   Power OFF 49234 257/0452 00-479 NBTR Playback 49234 257/0535 00-479 NBTR ...
   umpgal.gsfc.nasa.gov/www_root/homepage/uars-science/Weekly_Status/Weekly_Status_092200.html - 19k 9. North West/KLM
   Flight number: 479   Date: 10/10/2006   Check 10. Airline Travel Info - SFO, OAK, Real-Time Flight Status
    Find links on real-time flight status, airfare ticket purchasing, airport information and ...
    San Rafael, CA 94903 Phone: (415) 457-2717 Fax (415) 479-7017 ...

```
┌─────────────────────────────────────────────────┬────────┐
│ flight 479 status                               │ Search │
└─────────────────────────────────────────────────┴────────┘
``` flight 479 status

Flight number: [479]    Date: [10/10/2006]

Check: United Airlines - American Airlines - Alaska Airlines - Delta Airlines - North West/KLM - SAS - Air China 1. Status Update: XML-RSS, Magpie, cvs2rss, wp-agg, etc - Laughing Meme
   Status Update: XML-RSS, Magpie, cvs2rss, wp-agg, etc:...
   Flights said 479 days later:. Flights, British Airways Flights, Domestic Flights, Economic Flights ...
   laughingmeme.org/articles/2005/05/28/status-update-xml-rss-magpie-cvs2rss-wp-agg-etc - 90k 2. AltynAir
   Route flight No, Departure, Arrival, Days: Bishkek-Moscow ...
   QH 479, 14:20, 16:45, - - - -5 - - QH 480, 18:45, 04:35, - - - - 5 - - ...
   www.altynair.kg/en/flightsinfo/timetable/ - 30k 3. Category & forums listing - NASA Space Flight
   Click HERE to join. 479, 5799. Space Flight L2: Constellation and Future ...
   she prepares to join her two sisters in returning the fleet to launch status. ...
   forum.nasaspaceflight.com/ - 35k 4. STATUS REPORT
   We are continuing to coordinate with the Flight Operations Team and to assist ...
   Power OFF 49234 257/0452.00-479 NBTR Playback 49234 257/0535 00-479 NBTR ...
   umpgal.gsfc.nasa.gov/www_root/homepage/uars-science/Weekly_Status/Weekly_Status_092200.html - 19k 5. Airline Travel Info - SFO, OAK, Real-Time Flight Status
   Find links on real-time flight status, airfare ticket purchasing, airport information and ...
   San Rafael, CA 94903 Phone: (415) 457-2717 Fax: (415) 479-7017 ...
   www.marindoortodoor.com/travel/airline-travel.htm - 27k 6. FlightStats - SEA Airport Departure & Arrival Flight Status and ...
   The most complete, real-time flight status and flight tracker in the world including ...
   SFO, San Francisco, UA 479, United Airlines, 06:03 AM, 06:09 AM ...
   www.flightstats.com/go/FlightStatus/flightStatusByAirport.do?airportCode=SEA&airportQueryDate=2006-10... - 491k 7. Press Release
   5 had overstayed visas and had not adjusted their status. The others were convicted in ...
   Before this flight, 479 detainees had been deported by charter. ...
   www.embassyofpakistan.org/news24.php - 13k

[flight 479 status]                                        Search

1. Status Update: XML::RSS, Magpie, cvs2rss, wp-agg, etc - Laughing Meme
   Status Update: XML::RSS, Magpie, cvs2rss, wp-agg, etc...
   Flights said 479 days later. Flights, British Airways Flights, Domestic Flights, Economic Flights ...
   laughingmeme.org/articles/2005/05/28/status-update-xml-rss-magpie-cvs2rss-wp-agg-etc - 90k 2. AltynAir
   Route flight No, Departure, Arrival, Days, Bishkek-Moscow ...
   QH 479. 14:20, 16:45, - - - - 5 - - -; QH 480. 18:45, 04:35, - - - - 5 - - ...
   www.altynair.kg/en/flightsinfo/timetable/ - 30k 3. Category & forums listing - NASA Space Flight
   Click HERE to join 479; 5799. Space Flight L2: Constellation and Future ...
   she prepares to join her two sisters in returning the fleet to launch status. ...
   forum.nasaspaceflight.com/ - 35k 4. STATUS REPORT
   We are continuing to coordinate with the Flight Operations Team and to assist ...
   Power OFF 49234 257/0452.00-479 NBTR Playback 49234 257/0535 00-479 NBTR ...
   umpgal.gsfc.nasa.gov/www_root/homepage/uars-science/Weekly_Status/Weekly_Status_092200.html - 19k 5. Airline Travel Info - SFO, OAK, Real-Time Flight Status
   Find links on real-time flight status; airfare ticket purchasing, airport information and ...
   San Rafael, CA 94903 Phone: (415) 457-2717 Fax: (415) 479-7017 ...
   www.marindoortodoor.com/travel/airline-travel.htm - 27k 6. FlightStats - SEA Airport Departure & Arrival Flight Status and ...
   The most complete, real-time flight status and flight tracker in the world including ...
   SFO, San Francisco, UA 479, United Airlines, 06:03 AM, 06:09 AM ...
   www.flightstats.com/go/FlightStatus/flightStatusByAirport.do?airportCode=SEA&airportQueryDate=2006-10... - 491k 7. Press Release
   5 had overstayed visas and had not adjusted their status. The others were convicted in ...
   Before this flight, 479 detainees had been deported by charter. ...
   www.embassyofpakistan.org/news24.php - 13k 8. Welcome to Cyprus Airways official home page - Book online cheap ...
   Cyprus Airways travel planning site for cheap flights, ...
   Today that Cyprus is a member of the European Union, the status of the shops has changed and no ...
   www.cyprusairways.com/main/default.aspx?mid=479&TabID=90&ItemID=559 - 50k

United Airlines
Date: [10/16/2006]
Flight number: [479]  Check

American Airlines
Date: [10/16/2006]
Flight number: [479]  Check

Alaska Airlines
Date: [10/16/2006]
Flight number: [479]  Check

Delta Airlines
Date: [10/16/2006]
Flight number: [479]  Check

North West/KLM
Date: [10/16/2006]
Flight number: [479]  Check

SAS
Date: [10/16/2006]
Flight number: [479]  Check

Air China
Date: [10/16/2006]
Flight number: [479]  Check

Figure 14d

```
<FORM NAME="res_form">
    <A HREF="www.ual.com/"><B>flight 479 status</B></A>
    <TABLE>
     <TR>
      <TD>Flight number: </TD>
      <TD><INPUT TYPE="text" NAME="flight_number" VALUE="479" SIZE="8"></TD>
        <TD> Date: </TD>
        <TD><INPUT TYPE="text" NAME="flight_date" VALUE="10/10/2006" SIZE="10"></TD>
     </TR>
    </TABLE>

Check:
    <A HREF="javascript:createFlightStatusRequest('http://www.ua2go.com/flifo/FlightSummary.do?stamp=','date','fltNbr','&Check=Check');">United Airlines</A>
       -
       ...

</FORM>

<SCRIPT language=javascript>
function convertDate( date ){
  var k  = date.indexOf("/");
  var dd = date.substring(0,k);

var mmyyyy = date.substring(k+1,date.length);
  k = mmyyyy.indexOf("/");

var mm = mmyyyy.substring(0,k);
  var yyyy = mmyyyy.substring(k+1,mmyyyy.length);

var yyyymmdd = yyyy + mm + dd;
  return yyyymmdd;
} function createFlightStatusRequest( urlHead, flightDate, flightNumber, urlTail ){
  var rtn = urlHead;
  rtn += "&" + flightDate  + "=" + convertDate( document.res_form.flight_date.value );
  rtn += "&" + flightNumber + "=" + document.res_form.flight_number.value;
  rtn += urlTail;
  return rtn;
}
</SCRIPT>
```

ACCESSING DEEP WEB INFORMATION ASSOCIATED WITH TRANSPORTATION SERVICES USING A SEARCH ENGINE

RELATED APPLICATION

The present invention is a continuation-in-part application of non-provisional application Ser. No. 10/397,992, filed Mar. 25, 2003, entitled "Accessing deep web information using a search engine", which claims priority to provisional application 60/366,817, filed Mar. 25, 2002. The present application claims priority to said Ser. No. 10/397,992 non-provisional application and said 60/366,817 provisional application, and incorporates their specification in their entirety by reference.

FIELD OF THE INVENTION

The present invention relates to the field of data processing. More specifically, the present invention is related to accessing deep web pages potentially associated with transportation services using a search engine.

BACKGROUND OF THE INVENTION

Currently, Internet search engines index the information found on static web pages on public websites. Static web pages are web pages that exist before and after a user accesses them. A search engine saves two pieces of information from each static web page it indexes. The first piece of information is the location of the web page, commonly referred to as the uniform resource locator (URL). The second piece of information is one or more keywords from the text of the web page. A search engine is then, essentially, a collection of URLs and associated keywords.

Deep web information, however, is not contained on static web pages. Instead, it is produced in response to a specific query by a user and results in dynamic web pages. Search engines themselves are deep websites. A dynamic web page only exists after a user's query and disappears after the user exits the dynamic web page. As a result, deep web information or the dynamic web pages that can be generated from the deep web information are not typically available from search engines.

As a result, a user using a search engine to locate information, for certain type of information searching, often finds himself/herself not finding the right information, or having to re-enter the search criteria, as query parameters of queries to generate the dynamic web pages having the desired information.

Figure 8B:
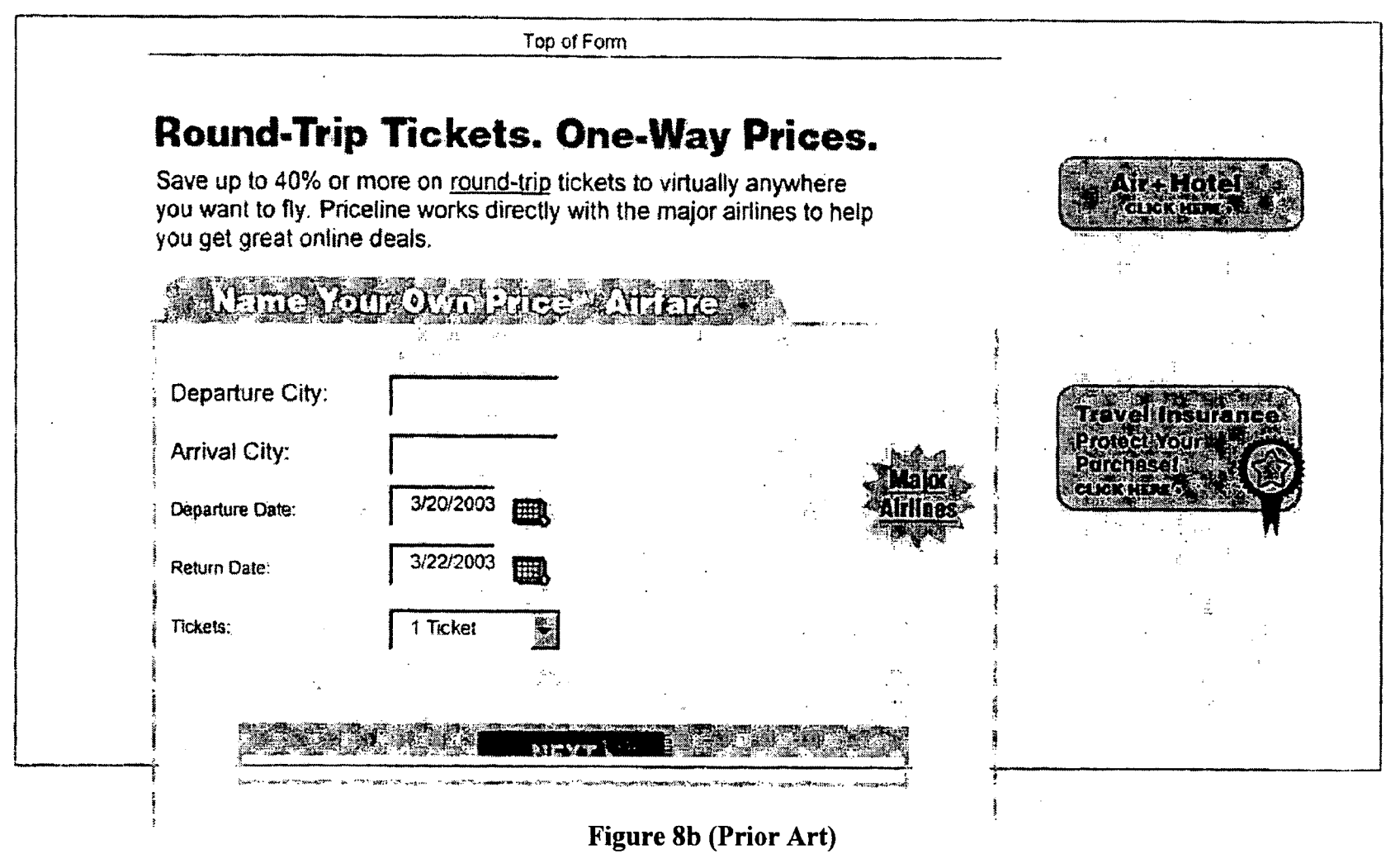

FIGS. 8a-8d illustrate one example of this problem. For the illustrated example, a user uses a search service/engine (such as Goggle) to search for "Flights from Seattle to San Jose". FIG. 8a illustrates selected portions of an example search answer web page returned from the search service/engine. An example search answer web page includes indices and indexing flight deals on Priceline and Orbitz's websites respectively, and indices and indexing static promotional pages on Southwest and Alaska Airline's websites respectively.

FIG. 8b illustrates the example static web page indexed by an index. It is essentially a form for facilitating a user to search for specific flight deals available on Priceline's website. In other words, because the flight deal web page for flights between Seattle and San Jose, if available, is dynamically generated based on flight deal information in a database, the proper query answer web page is not indexed by the search service/engine. Consequently it is not available. Only the generic static root web page (which could have been retrieved with merely the search criteria of "flight deals") is indexed, resulting in the user essentially having to start the search over again, once he/she enters Priceline's website.

Similar disadvantages exist, if the Orbitz website is entered via an index.

FIGS. 8c-8d illustrate the static promotional web pages indexed by indices. They are merely promotional web pages, and not the flight schedule or availability web pages that the user is looking for. Again, the reason is that the flight schedule and availability web pages are dynamically generated based on the flight schedule and availability information in the databases of Southwest and Alaska Airlines.

Figure 9A:
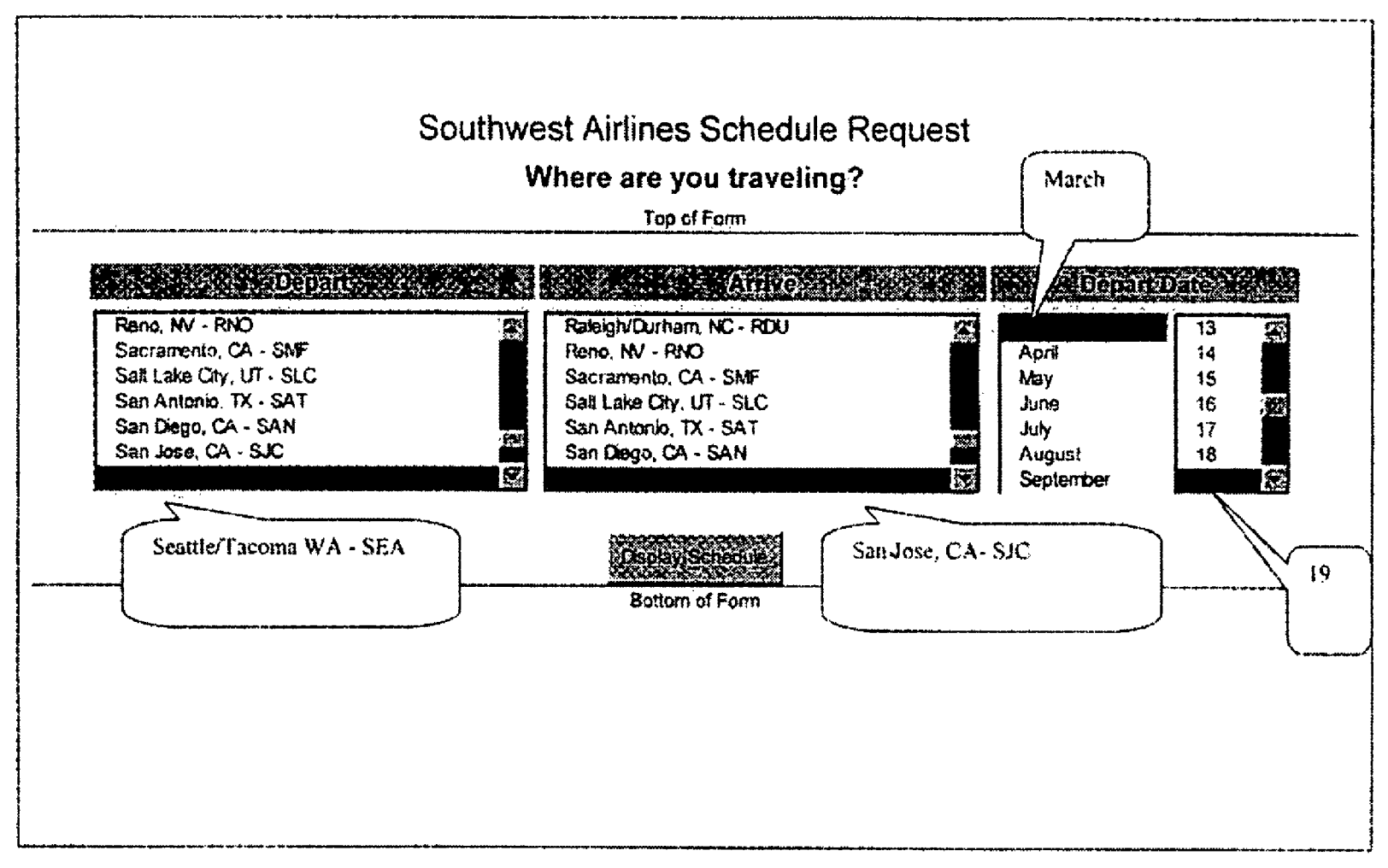

FIGS. 9a-9b illustrate the end results that the user desires. That is, in response to the user's provision to a search engine, of the search criteria "flights between Seattle and San Jose", the user is provided with a search answer page having indices that index not only the relevant static web pages, but also the relevant dynamic web pages to be generated, such as would be provided using this invention. Further, on selection of one of such indices, the user can be taken to the indexed dynamic web page, with the search criteria preserved, i.e. the from and to cities of Seattle and San Jose, filled in, without requiring the user to re-fill or re-select the search criteria again.

BRIEF DESCRIPTION OF THE DRAWINGS

The present invention will be described by way of exemplary embodiments, but not limitations, illustrated in the accompanying drawings in which like references denote similar elements, and in which:

FIGS. 3a-3b illustrate a number of reconciled queries with their associated query parameters, of a number of websites, for a number of example search criteria, created in accordance with the teachings of the present invention;

FIGS. 4a-4b illustrate a number of example proxy web page specifications, created in accordance with the teachings of the present invention;

FIGS. 5a-5b illustrate two example indices created using proxy web page specifications of the present invention;

FIGS. 6a-6d illustrate a source view and an end-user view each of two example pre-filled forms for two example queries employing the POST method to post its associated query parameters to the corresponding websites;

FIGS. 8a-8d illustrate the inadequacies of the prior art in facilitating a user in accessing deep web information using a search engine, for an example information search;

FIGS. 9a-9b illustrate two user desired results of the example information search of FIG. 8a-8d;

FIGS. 10a-10d illustrate four example search result pages associated with car rental service queries, in accordance with an embodiment of the present invention;

FIG. 11 illustrates an exemplary fragment of source code of a search result page, the page associated with a car rental service query;

FIGS. 12a-12d illustrate four example search result pages associated with train reservation service queries, in accordance with an embodiment of the present invention;

FIG. 13 illustrates an exemplary fragment of source code of a search result page, the page associated with a train reservation service query;

FIGS. 14a-14d illustrate four example search result pages associated with flight status information service queries, in accordance with an embodiment of the present invention; and FIG. 15 illustrates an exemplary fragment of source code of a search result page, the page associated with a flight status service query.

DETAILED DESCRIPTION OF EMBODIMENTS OF THE INVENTION

The present invention includes search engines enhanced to effectively index dynamic web pages, companion proxy servers, and related methods and apparatuses.

Part of the description will be presented in terms commonly employed by those skilled in the art to convey the substance of their work to others skilled in the art, including but are not limited to terms such as websites, static and dynamic web pages, queries, query parameters, query answer pages, search criteria, search answer web pages and forms. On a computing device, these logical entities are represented and manipulated in the form of electrical and/or optical signals.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The use of heading and sections are to facilitate understanding of the present invention, and they are not to be limiting on the present invention. The phrase "in one embodiment" is used repeatedly. The phrase generally does not refer to the same embodiment, however, it may. The terms "comprising", "having" and "including" are synonymous, unless the context dictates otherwise.

Overview

Figure 1:
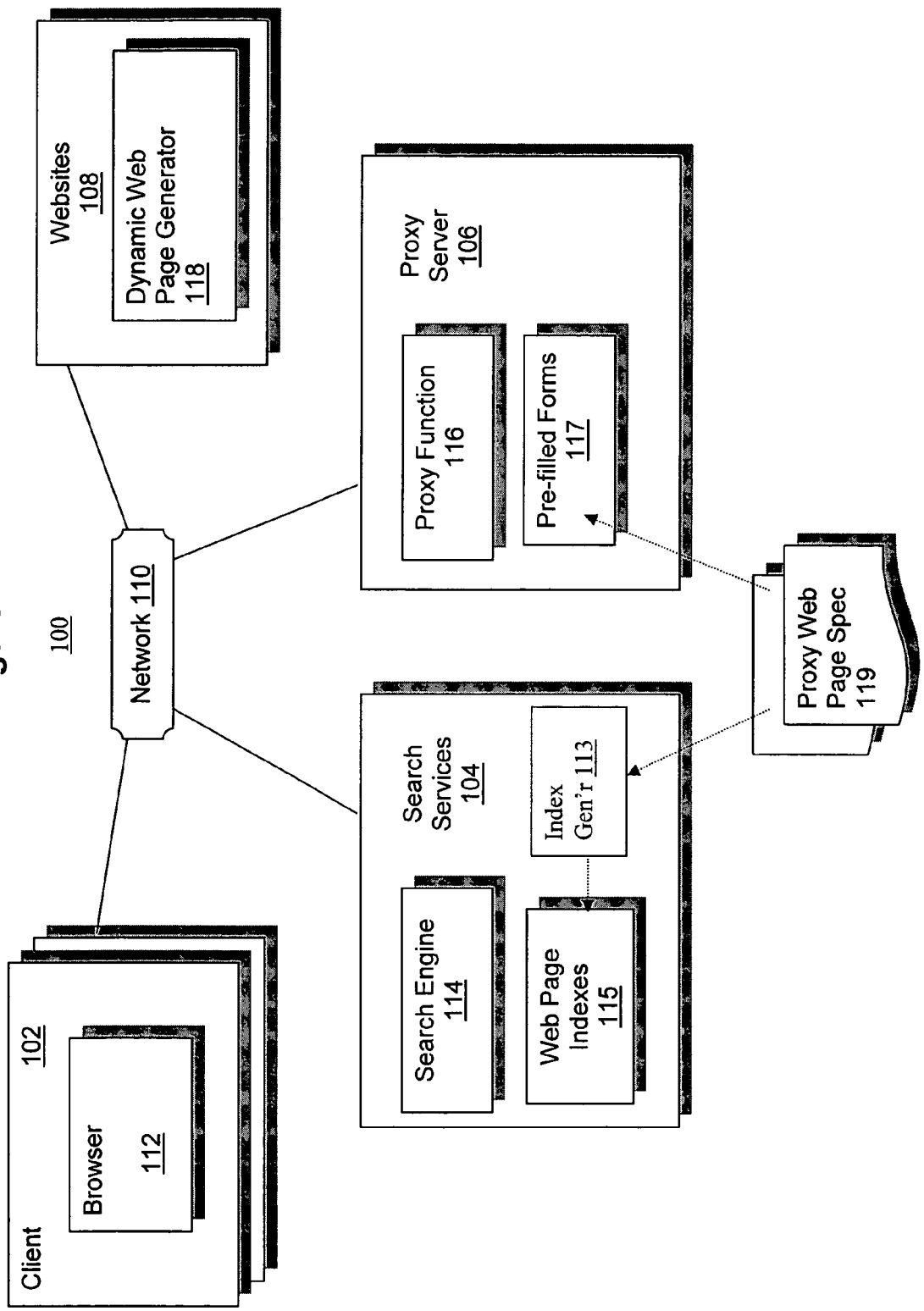
FIG. 1 illustrates network view of a computing environment suitable for practicing present invention, in accordance with one embodiment.

Referring now to FIG. 1, wherein a network view of a computing environment suitable for practicing the present invention, is shown. As illustrated, computing environment 100 includes a number of websites 108 offering services and/or information. In particular, each website 108 includes dynamic web page generator 118 to generate various dynamic web pages to facilitate delivery of the services and/or information offered.

Typically, dynamic web page generator 118 generates the various dynamic web pages using information stored in various databases (not shown) of websites 108, which may be co-resident or remotely disposed from the server(s) hosting websites 108 (but communicatively coupled). Each dynamic web page is typically generated in response to a query having a particular set of associated query parameters. Accordingly, these dynamic web pages will also be referred to as query answer web pages.

Further, the query answer web pages may be generated using Common Gateway Interface (CGI) scripts, in conjunction with instructions of one or more programming languages (Perl, C, C++, Basic, Fortran, Pascal, etc.), or a proprietary dynamic web page generator, such as Microsoft's generated ASP pages.

For the illustrated embodiment, communication with websites 108 are conducted using the Hypertext Transmission Protocol (HTTP) over Transmission Control Protocol/Internet Protocol (TCP/IP), and the dynamically generated web pages are specified using the Hypertext Markup Language (HTML). For some queries, the associated query parameters are submitted to websites 108 using a GET method, i.e. the associated query parameters of the queries are submitted in conjunction with the corresponding URLs, identifying the locations of the corresponding websites 108. Whereas, for other queries, the associated query parameters are submitted to websites 108 using a POST method, i.e. the associated query parameters of the queries are submitted separately (typically subsequently), after corresponding connections have been established with the websites 108, using their corresponding URLs. Thus, in the second method called the POST method, the URL is disassociated from the input parameters. The associated input parameters with the URL would make the resulting URL unique. However, without a unique URL, that is, without the association of the FORM URL with the specific input parameters, the completed FORM cannot be indexed by a search engine or cannot even be bookmarked by a browser.

In alternate embodiments, the present invention may be practiced with communication with websites 108 being practiced using other communication protocols, including but are not limited to HTTP Secure (HTTPS), File Transfer Protocol (FTP), Secure FTP (SFTP), Telnet, Secure Shell, Secure Copy (SCP), Goopher, and so forth.

Continuing to refer to FIG. 1, computing environment 100 further includes a number of clients 102, and search services 104, coupled to each other and to websites 108 via network 110. Clients 102, assisted by search services 104, selectively consume the services and/or information offered by websites 108.

For the embodiment, clients 102 include browsers 112, and use browsers 112 to consume the service and/or information offered by websites 108 in the form of web pages. Clients 102 further include operating system services (not shown) in support of browsers 112. Browsers 112, supported by the operating system services, are equipped to communicate with search services 104 and websites 108 in one or more of the earlier described protocols.

In alternate embodiments, browsers 112 and the underlying operating system services may be fully integrated. In other embodiments, some functions of browsers 112 and the underlying operating system services may be offered by an intermediate "middle" layer of services instead.

For the embodiment, search services 104 include search engine 114, web page indices 115 indexing web pages of websites 108 offering services and/or information, and index generator 113 to generate indices 115. As will be described in more detail below, under the present invention, web page indices 115 also advantageously index web pages of websites 108 that are dynamically generated in response to queries having associated query parameters.

Similar to clients 102, search services 104 further include operating system services (not shown) in support of elements 113-115. Search engine 114 supported by the operating system services, are equipped to communicate with clients 102 and websites 108 in the appropriate protocols.

In alternate embodiments, search engine 114 and the underlying operating system services may be fully integrated. In other embodiments, some functions of search engine 114 and the underlying operating system services may be offered by an intermediate "middle" layer of services instead.

For the embodiment, search services 104 are complemented by at least one proxy server 106, which is coupled to websites 108, clients 102, and search services 104 via network 110. Proxy server 106 includes in particular proxy function 116, and associated query parameter values 117 for pre-filling query forms to be provided to their websites 108. More specifically, for the earlier described HTML and HTTP oriented embodiment, pre-filled query forms facilitate posting of the associated query parameters to their websites 108 via the POST method.

The term "form" as used herein in the specification and in the claims, in general, refers to an electronic form which may be one of any one of a number of form types, including but are not limited to, HTML FORMs, Windows FORMs, ASP generated FORMs, Java FORMs, Javascript FORMs, directX FORMs, and so forth, as well as form-like documents and/or data structures/organizations, unless the context of a particular usage instance specifically narrows the meaning for the particular usage instance to a particular form type.

As illustrated, indices 115 that effectively index the dynamically generated query answer web pages, and if applicable, associated query parameter values 117 for pre-filling query forms are generated in accordance with proxy web page specifications 119 of the dynamically generated query answer web pages.

Except for indices 115 that effectively index the dynamically generated query answer web pages, associated query parameter values 117 for pre-filling query forms (if applicable) to facilitate submission of associated query parameters of queries of websites 108, and proxy web page specifications 119, clients 102 (including browsers 112), search services 104 (including search engine 114 and indices 115 that index static web pages), proxy server 106 (including proxy function 116), websites 108 (including dynamic web page generators 118 and their databases (not shown)), and network 110 represent a broad range of these respective elements known in the art or to be designed. In particular, network 110 may include one or more private and/or public networks, such as the Internet. Their functions and constitutions are known, accordingly will not be further described.

Otherwise, the method of the present invention, proxy web page specifications 119, indices 115 that effectively index the dynamically generated query answer web pages, and associated query parameter values 117 for pre-filling forms (if applicable) to facilitate submission of associated query parameters of queries of websites 108, will be described in turn, in the description to follow.

Initialization/Set Up

Figure 2:
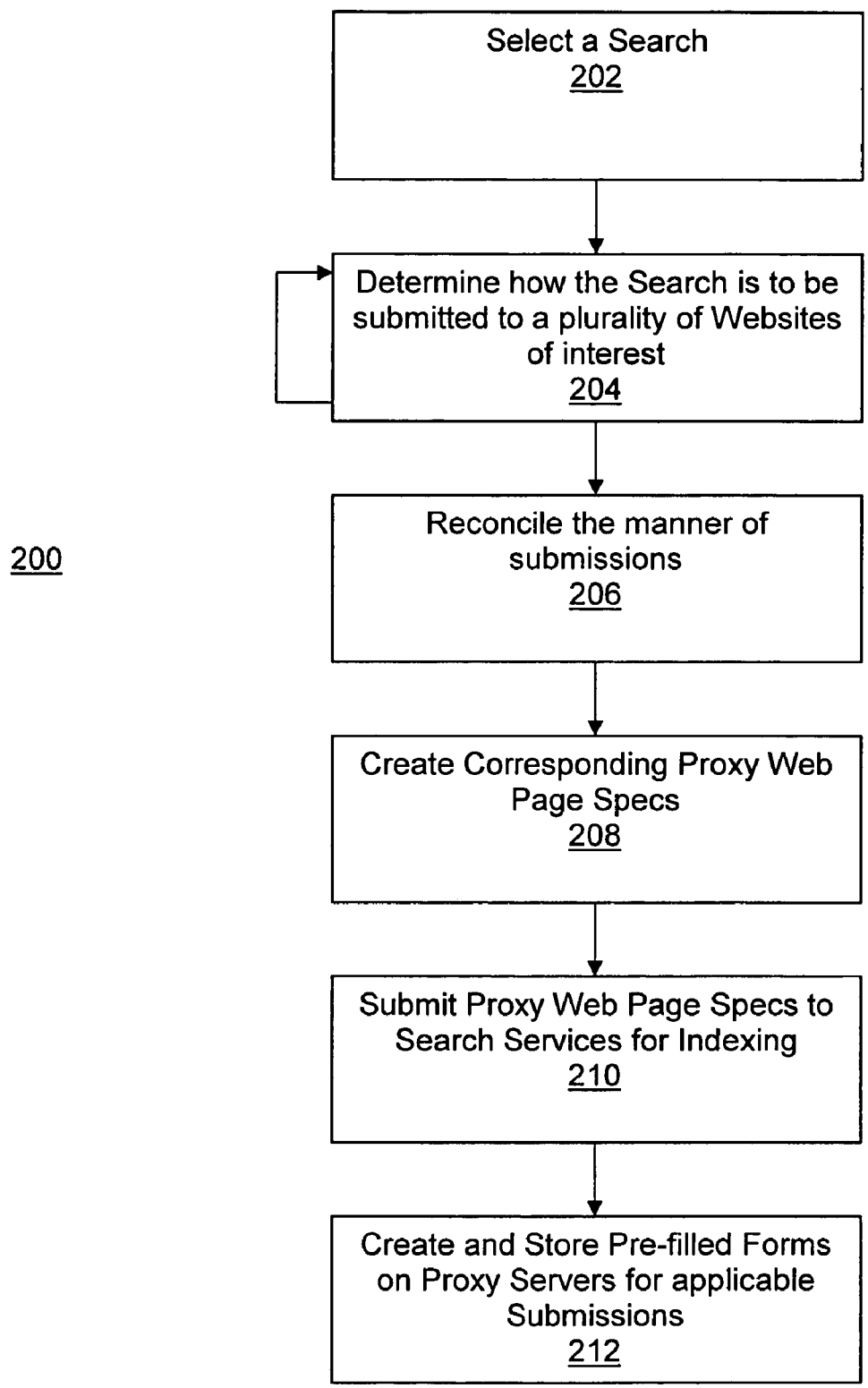
FIG. 2 illustrates an overview of the method of the present invention, in accordance with one embodiment.

FIG. 2 illustrates an overview of a method of the present invention, in accordance with one embodiment. More specifically, FIG. 2 illustrates the initialization or set up operations for setting up search services 104, and if applicable, proxy servers 106, to facilitate clients 102 to access deep web information of websites 108.

As illustrated, for each set of search criteria of interest, block 202, the queries including the associated query parameters, and the manner they are submitted to websites 108, e.g. whether through the GET method or the POST method, are identified, block 204. The identified queries are then reconciled, block 206.

The above operations are best illustrated by a couple of examples. The first example illustrates how queries of various used car websites of interest for various used car searches of a HTML/HTTP based embodiment are identified and reconciled, and the second example illustrates how queries of various airline websites of interest for various used flight schedule/availability searches of a HTML/HTTP based embodiment are identified and reconciled.

Used Car Sites

Suppose two used car deep web sites 108 are of interest. These sites are Automall.com and JoesCars.com, and for ease of understanding, their dynamically generated web pages are assumed to be HTML based. Moreover, communication with Automall.com and JoesCars.com are assumed to be HTTP based.

Further, the queries of their query answer web pages have similar query parameters. More specifically, Automall.com's query parameters are car make, car model, and user's zip code. JoesCars.com's query parameters are car make, car model, user's zip code and car year or years.

The first step in identifying and reconciling the queries of these sites is to find a minimum number of query parameters for this group of queries. In this example case, JoesCars.com has one more query parameter, which is the year or years. Since Automall.com does not have this parameter, it can be eliminated. If JoesCars.com requires the year or years, the largest range of years may be selected. For example, if JoesCars.com provides support for years between 1982 and 2002, then the year range for its query will always be 1982-2002.

Choosing a default constant value for the car year leaves three query parameters for both sites to be specified. This, however, may be reduced further. If it is assumed that every model name is unique, then the user may be able to make a query with just two pieces of information. These are the car model and user's zip code. If the car make is required by both sites, this will be provided in the query. The user will not, however, be required to enter it in the search engine query.

In various embodiments, during this stage of query identification and reconciliation, the user's options for query parameters may also be expanded. For example, if a list exists which associates a zip code to a city and state, the process may make plans to allow for a user to substitute a city or state in the search engine query. The query that is sent to each deep web site 108 will contain the zip code even though the user entered a city or state. If the list of associated cities and states for zip codes is used, the minimum number of query parameters for used car sites is still two. However, the parameters are now car model and user location.

Once the minimum number of query parameters is found, the next step is to identify how the query of each deep web site 108 in the group is invoked. This involves determining the query syntax and method of the HTTP request and the number and type of parameters required. Most of this information can be obtained by examining the HTML within the FORM statement of the dynamically generated query answer page. Any additional information that is required may be found by executing some sample queries.

Suppose that in the example given, it is found that Automall.com uses a GET HTTP request method and JoesCars.com uses a POST request method. Furthermore, Automall.com's URL syntax is http://www.automall.com/
used.html?make=chevrolet&model=corvette&zip=22043
and JoesCars.com's POST parameters are:
Make, Model, Year and Zip The request method and query syntax for the deep web sites 108 are then known. What remains to be understood is how the GET and POST parameters need to be added. For example, if the make parameter for Automall.com is entered through a text field, then it may be insensitive to the case of a make name. However, if the make parameter is obtained from a pulldown, there is only one way of representing each make name.

Assume that Automall.com and JoesCars.com list car make and model in user pulldowns which translate to HTML SELECT statements. All of the possible combinations of make and model can then be obtained from the HTML. Assume that the Year input for JoesCars.com is a TEXT field and "1982-2002" is an acceptable range syntax. Finally, assume that both sites accept a five-digit zip code through a TEXT field. The method for invoking the deep web sites is then well understood.

After defining the minimum set of query parameters and understanding the methods of invocation of each deep web site 108, the next step is to develop a list of site queries and parameter values.

For example, an excerpt from Automall.com's list is illustrated in FIG. 3a. The list contains the query URL followed by a set of query parameter values that a user might enter as a set of search criteria.

Note that the query URL contains the car make, but the set of query values does not. This is because the minimum set of query parameters was chosen. Note also that some query values contain the city name instead of the zip code, but the zip code was entered in the URL query. This is an example of the expansion of the possible query parameter values by using an additional file that associates zip codes and city names.

An excerpt from JoesCars.com list of site queries and parameter values 302-304 is also shown in FIG. 3a.

The first noticeable difference between Automall.com's list and JoesCars.com's list is the URL destination. Instead of JoesCars.com's URL, the destination is a proxy server's URL (outside.com). This is because of the HTTP request method used on the JoesCars.com site. A search engine cannot execute a POST request from one of its links. As a result, the link given to the search engine must be a GET request to a third party proxy site that can execute the post and return the JoesCars.com results page to the user.

Another difference is the additional Year parameter. As mentioned above, all queries are given the default range of "1982-2002" for this additional parameter. Also, since each site might span a different range of years the list of possible query parameter values might be different. For example, JoesCars.com might show Ford Granada while this model might be too old for Automall.com. Remember that in this example the car models were found by searching the SELECT statements of the HTML.

Note that while these lists might contain all possible inputs for the minimum set of query parameters, not all items in the list may be submitted to the search engine. Instead, each item on the list might be compared to previous search engine queries for relevance. If such a query is never entered, it may be excluded from the information given to the search engine.

Airline Reservation Sites

Suppose that two deep web airline reservations sites 108 are of interest for various flight schedule and availability searches. One is a general travel site that lists the reservations of many different airlines. This site is called GeneralTravel.com. The other is a site for a specific airline. This site is called FastJet.com.

Again, for ease of understanding, the dynamically generated web pages of GeneralTravel.com and FastJet.com are assumed to be HTML based, and communications with the two sites are HTTP based.

As with the used cars, the first step in identifying and reconciling the queries of the websites is to identify the minimum set of query parameters. For airline reservations the minimum set of parameters is four. These are the "departure date", "from location", "return date" and "to location". These parameters may also be used for hotel and car rental reservations. However, the "from location" is not needed for these types of reservations.

Suppose GeneralTravel.com also requires the number of people traveling. Since this is not part of the minimum set of parameters, the default can be used. In this case the default is one person.

The next step is to understand the method of query invocation on each site. Suppose that both GeneralTravel.com and FastJet.com use the GET HTTP request method. Also suppose that the URL syntax for each of these sites is as follows.

http://www.generaltravel.com/
res.html?persons=1&from=bwi&to=sfo&leave=0504&return=0506 http://www.fastjet.com/
res.html?fdest=bwi&tdest=sfo&start=0504&end=0506

The third step in the process is then to create the lists of site queries and parameter values. In the case of used car sites, the car models were limited by the values placed in the HTML select statements. Even the number of user zip codes was a finite set. However, the number of possible departure dates and return dates is infinite. As a result, the list of possible parameter values must be limited by some other means.

Suppose that most reservations are booked no more than one year in advance. Also, suppose that most travel takes place within one month. The possible parameter values are now considerably limited. First of all, the departure dates are then the next 365 days. For each departure date, there will be 30 return dates covering the following 30 days. Thus, there will be a total of 365 times 30, or 10,950 possible combinations of dates.

To complete the list of values, a list of all possible destinations must be available. Every possible combination of to and from destination can then be generated. Furthermore, the destinations can be specified as cities or airport codes. The complete list of parameter values is then 10,950 possible combinations of dates for each possible combination of to and from destinations.

An excerpt from GeneralTravel.com's list of site queries and parameter values 312-314 is also shown in FIG. 3b.

Note that the URL contains information not in the query. In this case, this is the "number of persons traveling." Also, note that query may contain the city or the airport, but the URL only contains the airport code. This implies that a list correlating airport codes and city names was used to generate the list of parameter values.

Referring back to FIG. 2, once the queries of the websites 108 of interest have been identified and reconciled, corresponding proxy web page specifications 119 for the dynamically generated query answer web pages are created, block 208, and submitted to search services 104 for processing to create indices 115 to index the dynamically generated query answer web pages.

Mores specifically, as earlier described, corresponding proxy web page specifications 119 are submitted to index generator 113, which generates, in response, the earlier described indices 115.

As described earlier, index generator 113 may be any one of a number of such elements known in the art or to be designed. Its functions and constitution are known, and except for its usage, the manner it is constituted is not essential to the present invention.

FIGS. 4a-4b illustrate one each, an example proxy web page specification 119a-119b for the queries of Automall.com and Generaltravel.com. In alternate embodiments, the information may be provided to search services 104 via other formats and/or approaches.

FIGS. 5a-5b illustrate the corresponding example indices that may be generated to effectively index the dynamic query answer pages for the earlier described search examples, i.e. used car search, and flight schedule and availability search. As illustrated, example indices 500a may comprise indices 502a-502b that advantageously index the dynamically generated query answer pages for the example used car search, and example indices 500b may comprise indices 502c-502b that advantageously index the dynamically generated query answer pages for the example flight schedule/availability search, and thereby overcoming the prior art deficiency of not having any index that indexes dynamically generated web pages.

Referring again to FIG. 2, and recalling from earlier descriptions, for queries of the HTML and HTTP embodiment employing the FORM and the POST method to post their associated query parameters to their websites 108, associated query parameter values 117 for pre-filling query forms are created and pre-stored in proxy server 106 to facilitate the form filling and parameter value posting. Accordingly, upon creation of appropriate proxy web page specifications 119 and their provisions to index generator 113 to generate indices 115, proxy web page specifications 119 are employed to create the associated query parameter values 117 and pre-filling forms and pre-store them with proxy server 106 for use during operation.

Associating query parameter values 117 for pre-filling query forms may be stored on proxy servers 106 using any one of a number of data structures and/or organizations known in the art or to be designed, including but are not limited to hash tables, flat files, relational databases, and so forth.

FIGS. 6a and 6c illustrate one each, a source view of an example pre-filled form 117a for the above described used car search example, and a source view of an example pre-filled form 117b for the above described flight reservation example, to facilitate posting of associated query parameters of queries corresponding to two dynamically generated query answer pages.

As illustrated, pre-filled form 117a has the values "Ford" and "Focus" pre-selected for the Make and Model parameters. Further, pre-filled form 117a has the zip code value "22043" pre-set for the zip code parameter.

Similarly, pre-filled form 117b has the parameters values for the departing city, destination city, number of passenger, whether it is a round trip reservation, departure date, return date, and so forth pre-filled.

For ease of understanding, some of the less illustrative source codes (in the "blank" areas) are omitted.

Figure 6B:
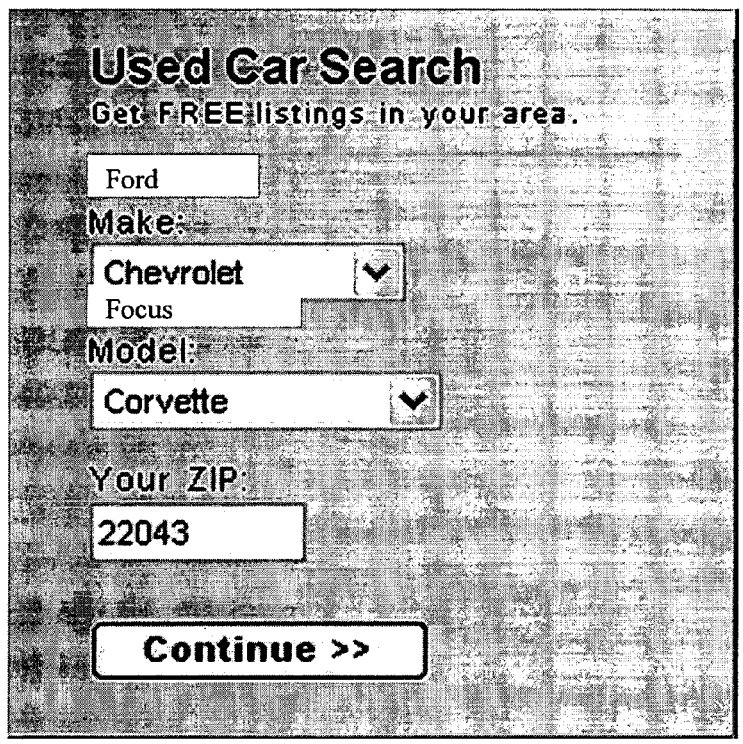
Figure 6D:

FIGS. 6b and 6d illustrate the end user view of the corresponding example pre-filled forms 117a and 117b for the above described used car and flight reservation search examples, when a user selects the index that effectively index the corresponding dynamically generated query answer page.

Those skilled in the art will appreciate that the examples have been purposely kept simple for ease of understanding. Nevertheless, they convey the substances of the present invention, even though in practice, typically more query parameters and query values are involved.

Operation

Thus, during operation, on receipt of a set of search criteria from a client 102, search service 104 is able to return a search answer page comprising indices indexing query answer web pages that are not persistent, and are to be dynamically generated.

As described earlier, example search result web pages for the earlier described examples, i.e. used car search and flight schedule and availability search may comprise indices 502a-502b and 502c-502d that advantageously index dynamically generated web pages, thereby overcoming the prior art deficiency of not having any index that indexes dynamically generated web pages.

Further, on selection, the search criteria will be carried forward, and incorporated into the dynamically generated answer web page, thereby also overcoming the prior art disadvantage of requiring the user to re-enter the search criteria. As described earlier, this is effectuated through the use of proxy server 106 and the complementary associated query parameter values 117 for pre-filling query forms pre-generated and pre-stored on proxy server 106.

In alternate embodiments, in lieu of retrieving the relevant forms in real time from the applicable websites 108, the present invention may be practiced with the forms pre-fetched, pre-filled and cached.

For the illustrated embodiment, preservation and transfer of the search criteria or query parameters are accomplished without resorting to the use of cookies (and client approval of such use). However, in alternate embodiments, some or all of the query parameters may be preserved and/or transferred involving the use of cookies (and client approval of such use).

Moreover, the present invention may be practiced with the preservation and transfer of other state information, in addition to the search criteria. Furthermore, the present invention may also be practiced in conjunction with the employment of one or more security techniques.

Example Computer System

Figure 7:
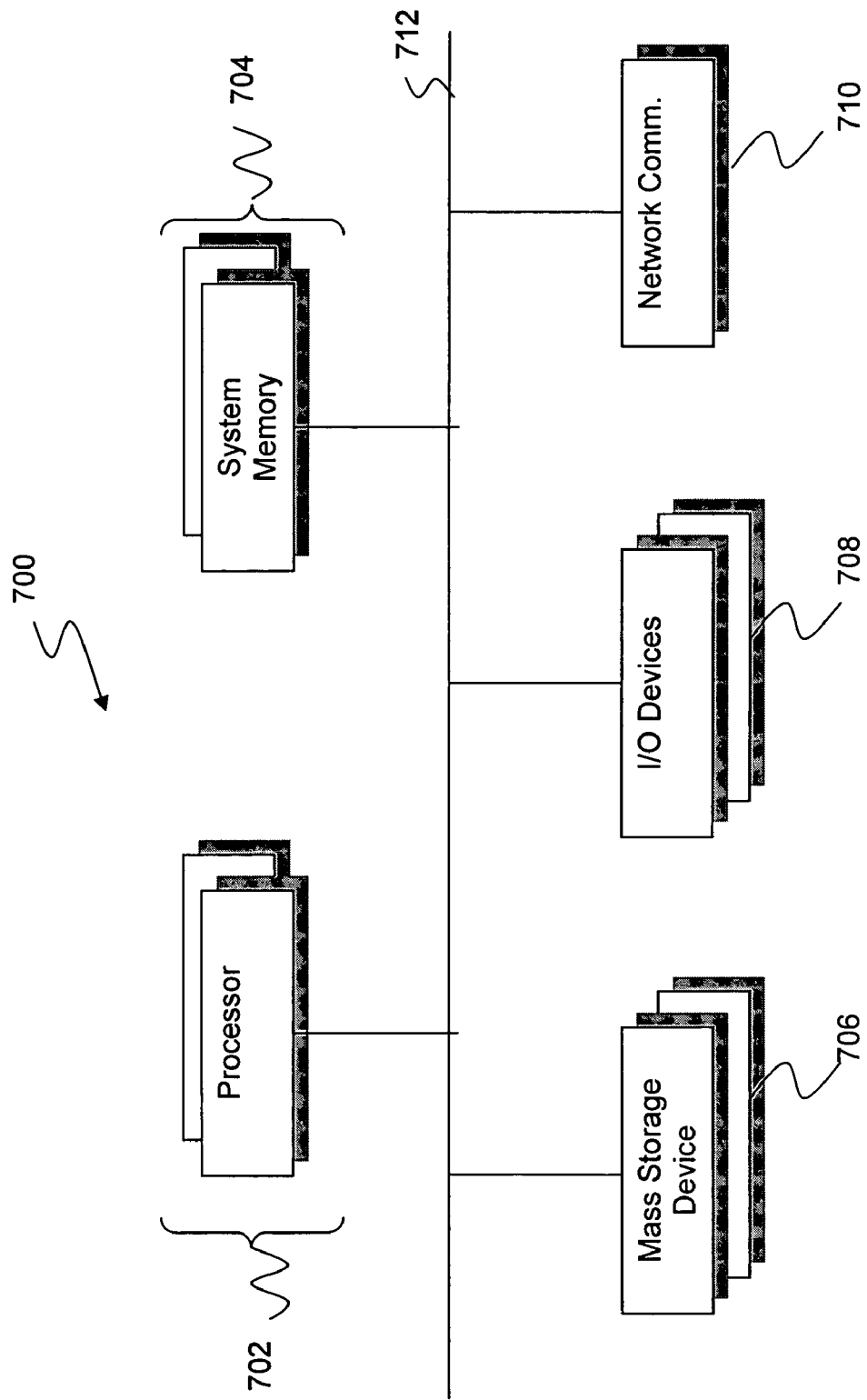
FIG. 7 illustrates an example computer system suitable for use as either a client or to host a proxy function, a search engine or a web server, to practice the present invention, in accordance with one embodiment.

FIG. 7 illustrates an example computing system suitable for use as either a client or to host the proxy function, the search engine or a web server to practice the present invention. As a client system, computing system 700 may be a desktop computer system, a laptop computer system, a tablet computing device, a palm sized computing device, a wireless mobile phone, a set-top box, an Internet appliance and the like. As a server, computing system 700 may be a single or a cluster of computer systems.

As shown, exemplary computing system 700 includes one or more processors 702 and system memory 704. Additionally, system 700 may include mass storage devices 706 (such as diskette, hard drive, CDROM and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, the buses are bridged by one or more bus bridges (not shown).

Each of these elements performs its conventional functions known in the art. In particular, system memory 704 and mass storage 706 are employed to store a working copy and a permanent copy of the programming instructions and/or data, implementing the teachings of the present invention (e.g. the enhanced indices of the search engine, the complementary pre-filled forms, and so forth). The programming instructions may be instructions of any one of a number of known or to be designed languages, including but are not limited to C, C++, Perl, Java, Javascript, XML, HTML and so forth. All or a portion of the permanent copy of the programming instructions/data may be loaded into mass storage 706 in the factory, in the field (via a distribution medium) or through communication interface 710 (from a distribution server (not shown)).

The constitution of these elements 702-712 are known, and accordingly will not be further described.

Additional Embodiments

In additional embodiments, illustrated by FIGS. 10-15, the search services and the proxy server may be effectively combined, by having the search services automatically select the indices that index the dynamically generated web pages, and cause the query result web pages to be embedded as part of the search result page. As can be seen from FIGS. 10, 12, and 14, embedded query result pages may be included as answers of the search results page. Such answers may include one or more input fields. In some embodiments, one or more of these fields may have values entered corresponding to one or all of the search criteria of the user search request. Other fields may be left empty or contain default values, and may thus enable a user to enter new values or alter default or previously entered values.

In one embodiment, the query results may be embedded into the search result page as other "hits"/answers, and placed as a group above, below, or among the other "normal" hits/answers. Example search result pages 1002a, 1202a, and 1402a of FIGS. 10a, 12a, and 14a, respectively, illustrate such as embodiment. In another embodiment, the query results may be embedded into the search result page as hits/answers, and may be interspersed among the other "normal" hits/answers. Example search result pages 1002b, 1202b, and 1402b of FIGS. 10b, 12b, and 14b, respectively, illustrate such as embodiment. In a third embodiment, the query results may be embedded into the search result page a single hits/answer, the single hit/answer providing an embedded query to serve as a proxy for a plurality of query result pages. Example search result pages 1002c, 1202c, and 1402c of FIGS. 10c, 12c, and 14c, respectively, illustrate such as embodiment. In yet another embodiment, the query results may be embedded into the search result page as hits/answers, and may be placed along the side of the other "normal" hits/answers. Example search result pages 1002d, 1202d, and 1402d of FIGS. 10d, 12d, and 14d, respectively, illustrate such as embodiment.

As is shown by FIGS. 10a-10d, embodiments of the present invention may make available deep web information associated with vehicular rental services to users by embedding query result pages of information locations associated with vehicular rentals as hits/answers of a search results page, the search results page having a plurality of answers. Each hit/answer embedding a query result page may include an input field for a rental location, fields for a pick-up date and time, field for a return date and time, and a field for a vehicle type. As shown, the times and vehicle type may be selected from a pre-determined choice list of options using a select box. In alternate embodiments, however any of the fields may be implemented as input text fields, select box lists, radio buttons, or any other form elements known in the art. Also, as illustrated, each hit/answer embedding a query result page may include a form element or hyperlink (in FIGS. 10a-10d, shown as the "Check" box) effectively indexing to the information location having the query result page that is embedded by the search results page. When actuated by a user, the values entered into the input elements of the form may be transmitted to the information location, and the information location may dynamically generate the query results page, including the transmitted values in its fields. Also, as is discussed above, the hits/answers embedding query result pages may be included as a group above the other normal hits/answers (FIG. 10a), may be interspersed among the other normal hit/answers (FIG. 10b), may be presented as a single hit/answer serving as a proxy for a plurality of query result pages (FIG. 10c), or may be presented along side of the other normal hits/answers (FIG. 10d). Also, FIG. 11 illustrates an exemplary fragment of source code of a search result page, the page associated with a car rental service query.

As illustrated by FIGS. 12a-12d, embodiments of the present invention may make available deep web information associated with train reservation services to users by embedding query result pages of information locations associated with train reservations as hits/answers of a search results page, the search results page having a plurality of answers. Each hit/answer embedding a query result page may include an input text field for a departure location, an input text field for an arrival location, and an input text field for a travel date. In alternate embodiments, any of the fields may be implemented as input text fields, select box lists, radio buttons, or any other form elements known in the art. Also, as illustrated, each hit/answer embedding a query result page may include a form element or hyperlink (in FIGS. 12a-12d, shown as the "Check" box) effectively indexing to the information location having the query result page that is embedded by the search results page. When actuated by a user, the values entered into the input elements of the form may be transmitted to the information location, and the information location may dynamically generate the query results page, including the transmitted values in its fields. Also, as is discussed above, the hits/answers embedding query result pages may be included as a group above the other normal hits/answers (FIG. 12a), may be interspersed among the other normal hit/answers (FIG. 12b), may be presented as a single hit/answer serving as a proxy for a plurality of query result pages (FIG. 12c), or may be presented along side of the other normal hits/answers (FIG. 12d). Also, FIG. 13 illustrates an exemplary fragment of source code of a search result page, the page associated with a train reservation service query.

As illustrated by FIGS. 14a-14d, embodiments of the present invention may make available deep web information associated with flight status information services to users by embedding query result pages of information locations associated with flight status information as hits/answers of a search results page, the search results page having a plurality of answers. Each hit/answer embedding a query result page may include an input text field for a flight number and an input text field for a flight date. In alternate embodiments, any of the fields may be implemented as input text fields, select box lists, radio buttons, or any other form elements known in the art. Also, as illustrated, each hit/answer embedding a query result page may include a form element or hyperlink (in FIGS. 14a-14d, shown as the "Check" box) effectively indexing to the information location having the query result page that is embedded by the search results page. When actuated by a user, the values entered into the input elements of the form may be transmitted to the information location, and the information location may dynamically generate the query results page, including the transmitted values in its fields. Also, as is discussed above, the hits/answers embedding query result pages may be included as a group above the other normal hits/answers (FIG. 14a), may be interspersed among the other normal hit/answers (FIG. 14b), may be presented as a single hit/answer serving as a proxy for a plurality of query result pages (FIG. 14c), or may be presented along side of the other normal hits/answers (FIG. 14d). Also, FIG. 15 illustrates an exemplary fragment of source code of a search result page, the page associated with a flight status service query.

In one embodiment, rather than embedding the exact query result web page in the search answer page, an approximation of the query result page may be embedded. For example, the exact query result page may include separate fields for a month and a date, while the embedded entry may include one combination field for the month and date. In such an embodiment, a transformation program may be applied to the search answer page's embedded submission, splitting, for example, the submitted month-year combination. The split submission may then be further submitted to the query result web site. Such a transformation program may be a JavaScript program or a program of any programming language known in the art. Such a transformation program may be a proxy between the search engine of the search results page and the target web site of the query result web page. In such a case, where the transformation program is a proxy, the HTTP request that a browser of the user displaying the search answer page generates may be redirected through the proxy, the proxy converting the combined form value, such as the combined month-date, of the HTTP request to the desired format, such as a split month and date, and sending the converted HTTP request to the target site. Also, the same (or different) proxy may receive the resulting web page from the target site and forward it back to the browser.

Also, embodiments of the present invention may make available deep web information associated with one or more of limousine reservation services, taxi reservations services, bus reservation/schedule services, both local and long distance, boat reservation/schedule services, ship reservation/schedule services, car rental location services, train status information services, ferry reservation/schedule services, and cruise liner reservation/schedule services to users by embedding query result pages of information locations associated with the service(s) as hits/answers of a search results page.

Alternate Embodiments

While the present invention has been described in terms of the foregoing embodiments, those skilled in the art will recognize that the invention is not limited to the embodiments described. The present invention can be practiced with modification and alteration within the spirit and scope of the appended claims.

In particular, while for ease of understanding, the search services and the proxy server have been described as two separate entities, in alternate embodiments, the two may be combined, or one or more functions of one or more of search services and proxy server may be distributed among additional implementation entities.

Further, in alternate embodiments, the present invention may also be suitably implemented, at least in part, in firmware or hardware, or some suitable combination of at least two of the three. Such firmware or hardware embodiments may include programmable logic devices, such as programmable array logic (PALs) and programmable logic arrays (PLAs), field programmable gate arrays (FPGAs), application specific integrated circuits (ASICs), large scale integrated circuits (LSIs), very large scale integrated circuits (VLSI) or the like—to form the various types of modules, circuitry, controllers, routines and systems described and claimed herein.

CONCLUSION AND EPILOGUE

Thus, it can be seen from the above descriptions, a novel method, including associated apparatuses, for accessing deep web information associated with transportation services has been described. The description is to be regarded as illustrative instead of restrictive on the present invention, which scope is set forth in the claims to follow.

What is claimed is:

1. A computer implemented method, comprising:
   receiving by a search service computer server on the Internet, from a client device having access to the Internet, a search request associated with searching for a transportation service, wherein the search request includes a plurality of search criteria; and directs the search service computing server to search the Internet for a plurality of information locations on the Internet having information associated with the plurality of search criteria; and
   returning to the client device, in response to the search request, by the search service computing server, an answer page having a plurality of answers potentially associated with the transportation service, the plurality of answers identifying a plurality of information locations on the Internet having information potentially associated with at least a one of the plurality of search criteria, wherein a first of the answers associated with a first information page of a first information location on the Internet having information associated with the search criteria does not include any input field displayed on the answer page, and a second of the answers associated with a second information page of a second information location on the Internet having information associated with the search criteria includes at least one input field displayed on the answer page, wherein the input field is associated with the second information page and at least one feature of the transportation service
   wherein the second answer is placed in the answer page either ahead of or at a side of the first answer;
   wherein the second of the answers including at least one input field further includes an index indexing to the second information location to dynamically generate the second information page, the index including a query and a set of one or more associated parameters, and the set of one or more associated parameters including at least one parameter variable corresponding to the at least one input field for entry of the at least one feature of the transportation service.

2. The method of claim 1, wherein the search request is associated with a vehicular rental service, and the plurality of search criteria include at least one of a rental location, a vehicle pick-up date, a vehicle return date, or a vehicle type.

3. The method of claim 2, wherein the second of the answers includes a plurality of input fields configured to enable a user to further indicate one or more of the rental location, the vehicle pick-up date, the vehicle return date, or the vehicle type that were not included among the plurality of search criteria.

4. The method of claim 3, wherein the plurality of input fields are organized into four rows, a first row for indicating the rental location, a second row for indicating the vehicle pick-up date, a third row for indicating the vehicle return date, and a fourth row for indicating the vehicle type.

5. The method of claim 2, further comprising transmitting a query to the second information location, the query including one or more query parameters, and the one or more query parameters including at least one of the rental location, the vehicle pick-up date, the vehicle return date, or the vehicle type inputted through the at least one input field.

6. The method of claim 1, wherein the search request is associated with a train reservation service, and the plurality of search criteria include at least one of a departure location, an arrival location, or a travel date.

7. The method of claim 6, wherein the second of the answers includes a plurality of input fields configured to enable a user to further indicate one or more of the departure location, the arrival location, or the travel date that were not included among the plurality of search criteria.

8. The method of claim 7, wherein the plurality of input fields are organized into three rows, a first row for indicating the departure location, a second row for indicating the arrival location, and a third row for indicating the travel date.

9. The method of claim 6, further comprising transmitting a query to the second information location, the query including one or more query parameters, and the one or more query parameters including at least one of the departure location, the arrival location, or the travel date inputted through the at least one input field.

10. The method of claim 1, wherein the search request is associated with a flight status service, and the plurality of search criteria include at least one of a flight number and a flight date.

11. The method of claim 10, wherein the second of the answers includes a plurality of input fields configured to enable a user to further indicate one or both of the flight number or the flight date that were not included among the plurality of search criteria.

12. The method of claim 11, wherein the plurality of input fields are organized into one row for indicating the flight number and the flight date.

13. The method of claim 10, further comprising transmitting at query to the second information location, the query including one or more query parameters, and the one or more query parameters including at least one of the flight number or the flight date inputted through the at least one input field.

14. The method of claim 1, wherein the second of the answers includes at least one input field that identifies a plurality of information locations on the Internet, each having information potentially associated with at least one of the plurality of search criteria.

15. The method of claim 1, wherein the transportation service is one of a limousine reservation service, a taxi reservations service, a bus reservation/schedule service, a boat reservation/schedule service, a ship reservation/schedule service, a car rental location service, a train status information service, a ferry reservation/schedule service, or a cruise liner reservation/schedule service.

16. The method of claim 1, wherein the second answer is placed in the answer page ahead of the first answer.

17. The method of claim 1, wherein the second answer is placed in the answer page at a side of the first answer.

18. An apparatus comprising:
a processor; and
logic operated by the processor and adapted to
receive a search request associated with a transportation service from a client device having access to the Internet, wherein the search request includes a plurality of search criteria and directs the apparatus to search the Internet for a plurality of information locations on the Internet having information associated with the plurality of search criteria; and
return to the client device an answer page having a plurality of answers potentially associated with the transportation service, wherein the plurality of answers identify a plurality of information locations on the Internet having information potentially associated with at least a one of the plurality of search criteria, wherein a first of the answers associated with a first information page of a first information location on the Internet having information associated with at least one of the search criteria and does not include any input field displayed on the answer page, and a second of the answers includes at least one input field of a second information page associated with a second information location on the Internet having information associated with at least one of the search criteria for entry of at least one feature of the transportation service;
wherein the second answer is placed in the answer page either ahead of or at a side of the first answer;
wherein the second of the answers including at least one input field further includes an index indexing to the second information location to dynamically generate the second information page, the index including a query and a set of one or more associated parameters, and the set of one or more associated parameters including at least one parameter variable corresponding to the at least one input field for entry of the at least one feature of the transportation service.

19. The apparatus of claim 18, wherein the transportation service is one of a vehicular rental service, a train reservation service, a flight status service, a limousine reservation service, a taxi reservations service, a bus reservation/schedule service, a boat reservation/schedule service, a ship reservation/schedule service, a car rental location service, a train status information service, a ferry reservation/schedule service, or a cruise liner reservation/schedule service.

20. An article of manufacture comprising:
a tangible computer readable storage medium; and
a plurality of programming instructions stored on the storage medium and configured to program an apparatus to enable the apparatus, upon execution of the programming instructions, to perform operations including:
receiving a search request associated with a transportation service from a client device on the Internet, the apparatus being coupled to the Internet, the search request including a plurality of search criteria and directs the apparatus to search the Internet for a plurality of information locations on the Internet having information associated with the plurality of search criteria; and
return to the client device an answer page having a plurality of answers potentially associated with the transportation service, the plurality of answers identifying a plurality of information locations on the Internet having information potentially associated with at least a one of the plurality of search criteria, wherein a first of the answers associated with a first information page of a first information location on the Internet having information associated with at least one of the search criteria and does not include any input field displayed on the answer page, and a second of the answers includes at least one input field of a second information page of a second information location on the Internet having information associated with at least one of the search criteria for entry of at least one feature of the transportation service;

wherein the second answer is placed in the answer page either ahead of or at a side of the first answer;

wherein the second of the answers including at least one input field further includes an index indexing to the second information location to dynamically generate the second information page, the index including a query and a set of one or more associated parameters, and the set of one or more associated parameters including at least one parameter variable corresponding to the at least one input field for entry of the at least one feature of the transportation service.

21. The article of claim 20, wherein the transportation service is one of a vehicular rental service, a train reservation service, a flight status service, a limousine reservation service, a taxi reservations service, a bus reservation/schedule service, a boat reservation/schedule service, a ship reservation/schedule service, a car rental location service, a train status information service, a ferry reservation/schedule service, or a cruise liner reservation/schedule service.

* * * * *

UNITED STATES PATENT AND TRADEMARK OFFICE
CERTIFICATE OF CORRECTION

| | | |
|---|---|---|
| PATENT NO. | : 7,716,303 B2 | Page 1 of 1 |
| APPLICATION NO. | : 11/595090 | |
| DATED | : May 11, 2010 | |
| INVENTOR(S) | : Michael Z. Moricz | |

It is certified that error appears in the above-identified patent and that said Letters Patent is hereby corrected as shown below:

Column 15, Lines 38-39 reads "transmitting at query to the" should read -- transmitting a query to the --

Signed and Sealed this
Twenty-second Day of March, 2011

David J. Kappos
*Director of the United States Patent and Trademark Office*